(12) United States Patent
Yoshii et al.

(10) Patent No.: US 7,730,249 B2
(45) Date of Patent: Jun. 1, 2010

(54) DEVICE CONTROL APPARATUS THAT CALLS AN OPERATING SYSTEM TO CONTROL A DEVICE

(75) Inventors: Kenichiro Yoshii, Tokyo (JP); Tatsunori Kanai, Kanagawa (JP); Hiroshi Yao, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 153 days.

(21) Appl. No.: 11/896,848

(22) Filed: Sep. 6, 2007

(65) Prior Publication Data

US 2008/0155153 A1 Jun. 26, 2008

(30) Foreign Application Priority Data

Dec. 25, 2006 (JP) ............................. 2006-348504

(51) Int. Cl.
*G06F 13/24* (2006.01)
(52) U.S. Cl. ........................................ 710/267; 714/23
(58) Field of Classification Search ................. 710/260, 710/261, 267; 714/10, 23
See application file for complete search history.

(56) References Cited

U.S. PATENT DOCUMENTS 5,392,052 A * 2/1995 Eberwine ............... 342/357.09

7,219,264 B2 * 5/2007 Pail et al. ...................... 714/23

FOREIGN PATENT DOCUMENTS

| JP | 6-12293 | 1/1994 |
| JP | 10-15201 | 1/1998 |
| JP | 2000-66926 | 3/2000 |
| JP | 2000-330806 | 11/2000 |

OTHER PUBLICATIONS

Intel® "Virtualization Technology Specification for the IA-32 Intel® Architecture", (Apr. 2005).

* cited by examiner

*Primary Examiner*—Clifford H Knoll
(74) *Attorney, Agent, or Firm*—Finnegan, Henderson, Farabow, Garrett & Dunner, L.L.P.

(57) ABSTRACT

In a device control apparatus, a processor that operates according to software, an OS storage unit stores Operating Systems that operate on the processor, and a storage unit stores privileged software which operates on the processor. The privileged software calls one of the Operating Systems when the processor receives an interrupt from a device, and the Operating System controls the device. Furthermore, a detecting unit detects an interrupt to the processor, a judging unit judges whether the Operating System has called the privileged software from the storage unit in a first predetermined time from detection of the interrupt, and a resetting unit resets the processor when the judging unit judges that the Operating System 9em has not called the privileged software from the storage unit.

19 Claims, 13 Drawing Sheets

DEVICE CONTROL APPARATUS THAT CALLS AN OPERATING SYSTEM TO CONTROL A DEVICE

CROSS-REFERENCE TO RELATED APPLICATIONS

This application is based upon and claims the benefit of priority from the prior Japanese Patent Application No. 2006-348504, filed on Dec. 25, 2006; the entire contents of which are incorporated herein by reference.

BACKGROUND OF THE INVENTION

1. Field of the Invention

The present invention relates to a device control apparatus having plural types of software installed thereon.

2. Description of the Related Art

Hitherto, in database systems and server machines designed for executing mission critical process, emphasis has been put on reliability or security from the viewpoint of importance of the processing and confidentiality of the data held inside. Recently, however, the reliability and security has increased their importance not only in such general computers but also in various devices such as embedded systems.

On the other hand, along with the recent downsizing trend of system LSI, there is an increasing tendency of realizing plural functions, which have been hitherto realized by individual and dedicated hardware, by the software by embedding a processor on the system LSI. By executing plural types of software on the processor in the system LSI, more functions can be realized by one system LSI.

In this case, it is necessary to prevent leakage of a group of software (for example, confidential programs such as encrypting programs executed on a processor, and valuable programs such as media processing) which realizes functions hitherto realized by the hardware, like data such as personal information.

When plural programs operate on one processor, if one program has a defect, execution of all other programs is disturbed and the operation of the entire apparatus may be stopped. Or if a program installed, for example, by downloading from outside is an evil or unjust program, secret information or program may be leaked outside, or may be destroyed or altered.

To solve such problems, it is necessary to control the access to resources such as memories or devices assigned to the program for realizing each function. For example, a program or a functional unit may be prohibited from accessing to the resources assigned to other program, or access from plural functions or programs to shared resource can be exclusively controlled. Access control mechanism and access control information themselves must be protected from arbitrary manipulation.

Virtual machine technique is proposed as a means for enhancing the reliability and security by realizing the protections and executing plural functions separately. The virtual machine technique can be implemented in various manners. According to one manner of implementation, a virtualization layer is provided between hardware and operating system (OS), and plural operating systems (guest OSs) operate on the virtualization layer. The virtualization layer is generally called hypervisor layer. The hypervisor layer manages the resources and provides a virtual machine which is composed of resources assigned to an individual guest OS. As a result, the plurality of guest OSs can be executed in isolated state without interfering with each other. When the function of the hypervisor layer is realized by software, such software is called hypervisor.

Processors used in general computers have hardware configuration themselves for supporting virtualization. One example thereof is a technology proposed by Intel® Corporation in "Intel® Virtualization Technology Specification for the IA-32 Intel® Architecture", [online], [searched on May 31, 2005], Internet <URL: ftp://download.intel.com/technology/computing/vptech/C97063-002.pdf>]. A processor which implements the technology is provided with many privilege modes indicating authority of the executed program, and the program can transit to a higher privilege mode during an execution of any instruction. As a result, the hardware can monitor access of the guest OS to shared resource, while the software granted with a higher privilege mode at a time of the access can check an access content of the guest OS.

Another example is a technology proposed by Advanced Micro Devices, Inc. A processor which implements this technology includes a mechanism for intercepting an interrupt, and a function for generating a virtual interrupt by software. Hence, after the hypervisor intercepts an interrupt, the processor can manage delivery of the interrupt to a guest OS which needs the interrupt. In addition, the processor is provided with a mechanism for monitoring the access of a guest OS to an address translation table. Thus, the guest OS is prevented from rewriting the address translation table freely in an attempt to access a memory region assigned to other guest OS.

However, unlike advanced processors used in server computers or general computers, existing processors embedded in system LSI or SoC (System on Chip) have limited functions and are not provided with functions for supporting virtualization: Usually, these processors support only two privilege modes, i.e., privilege mode and non-privilege mode. When plural guest OSs are executed on such a processor, each guest OS operates in the privilege mode of highest level.

When a guest OS operates on such a processor in the privilege mode of the highest level, the guest OS can freely use an access control mechanism of the processor. The processor cannot protect an interrupt vector table, in which instructions are stored to be executed in response to an interrupt request, from rewriting by the guest OS. The guest OS can make an attack by causing troubles by ignoring an interrupt of a device used by other guest OS, or returning a false reply to the interrupt of the device.

It means that the processor cannot protect itself using software alone when malicious software tries to disturb the delivery of an interrupt of a device. This is because, since the guest OS operates on the processor in the privilege mode of highest level, and the interrupt of a device does not occur synchronously with the operation of the processor, if the malicious software is operating at the moment the interrupt is notified to the processor, the processor cannot change over the control to other guest OS or the like.

SUMMARY OF THE INVENTION

According to one aspect of the present invention, a device control apparatus includes a processor that operates according to software, a storage unit that stores privileged software which manages an interrupt to the processor from a device included in the device control apparatus, an OS storage unit that stores an Operation System for calling the privileged software from the storage unit when an interrupt from the device is detected during an execution of the software, a detecting unit that detects an interrupt to the Operation System from the device while the Operation System is operating on the processor, a judging unit that judges whether the Operation System has called the privileged software from the storage unit in a first predetermined time from detection of the interrupt to the Operation System from the device, and a resetting unit that resets the processor when the judging unit judges that the Operation System has not called the privileged software from the storage unit.

According to another aspect of the present invention, a device control apparatus includes a processor that operates according to software, a storage unit that stores privileged software which manages an interrupt to the processor from a device connected to the device control apparatus, an OS storage unit that stores an Operation System for calling the privileged software from the storage unit when an interrupt from the device is detected during an execution of the software, a detecting unit that detects an interrupt to the Operation System from the device while the Operation System is operating on the processor, a judging unit that judges whether the Operation System has called the privileged software from the storage unit in a first predetermined time from detection of the interrupt to the Operation System from the device, and a resetting unit that resets the processor when the judging unit judges that the Operation System has not called the privileged software from the storage unit.

DETAILED DESCRIPTION OF THE INVENTION

Figure 1:
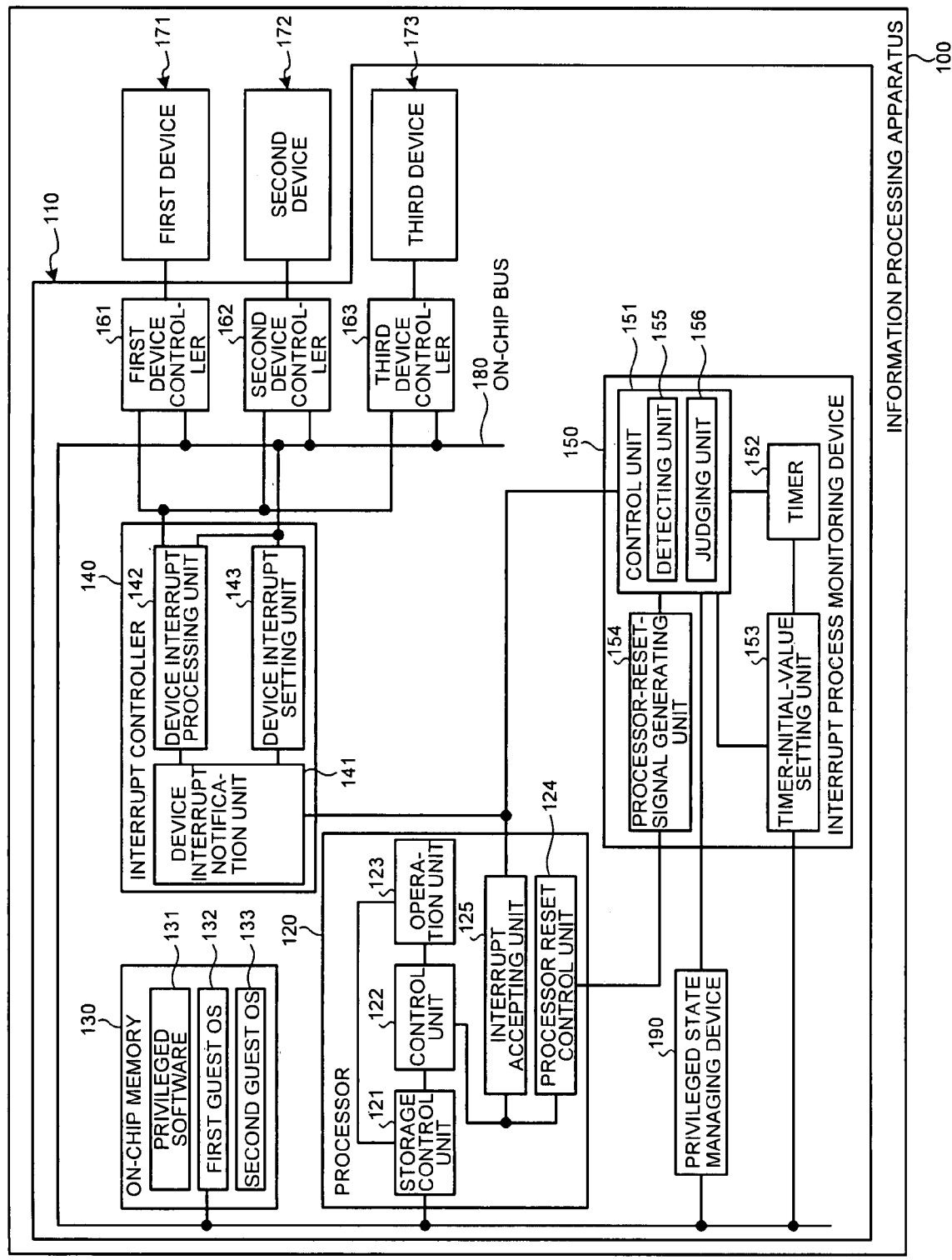
FIG. 1 is a block diagram of an information processing apparatus according to a first embodiment.

As shown in FIG. 1, an information processing apparatus 100 according to a first embodiment includes a system LSI 110, a first device 171, and a second device 172.

The first device 171 and the second device 172 are connected to the system LSI 110, and are controlled by a processor 120 embedded in the system LSI 110. The first device 171 and the second device 172 may be provided either in a housing of the information processing apparatus 100, or outside the information processing apparatus 100. The number of devices connected to the information processing apparatus 100 is not limited to two, but is arbitrary.

Each of the first device 171 and the second device 172 can be, for example, a memory module, a hard disk drive, other external storage device of large capacity, a network interface, other external communication device, a keyboard, a mouse, other input device used by a user for input, a display, or other external output device, but is not limited to these.

The system LSI 110 includes a processor 120, an on-chip memory 130, an interrupt controller 140, an interrupt process monitoring device 150, a first device controller 161, a second device controller 162, a third device controller 163, a third device 173, an on-chip bus 180 for connecting the components, and a privileged state managing device 190.

The third device 173 is controlled by the processor 120 explained later. Similarly to the third device 173, devices controlled by the processor may be provided inside the system LSI 110.

The first device controller 161 accepts an access to the first device 171 by the processor 120 or the like through the on-chip bus 180, and sends out a control signal to the first device 171 according to an access content. The first device controller 161 converts a signal sent from the first device 171 into data to be transmitted to the on-chip bus 180, and transmits the data to the processor 120 or the like through the on-chip bus 180. Further, the first device controller 161 sends out an interrupt request from the first device 171 to the interrupt controller 140 to give notification to an interrupt accepting unit 125 of the processor 120 and the interrupt process monitoring device 150.

The second device controller 162 and the third device controller 163 execute the same process as that executed by the first device controller 161 except that the second device controller 162 and the third device controller 163 control the second device 172 and the third device 173, respectively; therefore, the explanation thereof is not repeated.

The on-chip memory 130 stores privileged software 131, a first guest OS 132, and a second guest OS 133 therein. In other words, the on-chip memory 130 corresponds to a structure including a storage unit for storing the privileged software 131, and an OS storage unit for storing the first guest OS 132 and the second guest OS 133. In the first embodiment, the privileged software 131, the first guest OS 132, and the second guest OS 133 are stored in one on-chip memory 130, but they may be stored in separate storage units. The number of guest OSs stored in the on-chip memory 130 is not limited to two, but is arbitrary.

The privileged software 131 is software for managing interrupts made by the device. The privileged software 131 is regarded as a truly reliable unit, and is allowed to access a timer-initial-value setting unit 153 of the interrupt process monitoring device 150. When other guest OS receives an interrupt request from a device while operating normally on the processor 120, the guest OS calls the privileged software. Therefore, the privileged software 131 can manage all interrupts made by the device(s). In the first embodiment, the privileged software 131 is executed immediately after the activation of the processor 120 and immediately after the recovery of the processor from a reset without fail. Here, the reset means to forcibly change an instruction executed by the processor 120 to a predetermined instruction ignoring the previous process. In the first embodiment, the reset is equivalent to rewriting a content of a register, which stores an address of an instruction of a currently-operating guest OS, process, or the like, or an address of an instruction to be fetched next, with an address of an instruction of the privileged software.

A mechanism for assuring the reliability of the privileged software 131 is not particularly specified. In the first embodiment, a read-only region is provided on the on-chip memory 130, and privileged software 131 is preliminarily written in this region at the time of manufacture. In other embodiment, the information processing apparatus 100 may be connected to an authentication device, which checks through the on-chip bus 180 whether or not the privileged software 131 stored in the on-chip memory 130 has been altered. The privileged software 131 may be activated only when the authentication device determines that the privileged software has not been altered.

In the first embodiment, while the privileged software 131 operates, the information processing apparatus 100 on which the privileged software 131 operates is referred to be in a "privileged state". When the privileged software 131 starts operating on the processor 120, the privileged state managing device 190 described later detects the privileged state of the information processing apparatus 100, and notifies a control unit 151 of the interrupt process monitoring device 150. Thus, the control unit 151 of the interrupt process monitoring device 150 can recognize whether the information processing apparatus 100 is in the privileged state or not. The control unit 151 of the interrupt process monitoring device 150 may recognize the privileged state of the information processing apparatus 100 in any manner other than the one described above.

The privileged software 131 may restrict access to each device by software, such as an OS and privileged software. In the first embodiment, the second device 172 is controlled exclusively by the first guest OS 132, and the third device 173 is controlled exclusively by the second guest OS 133.

The first guest OS 132 and the second guest OS 133 operate on the processor 120 described later. The first guest OS 132, the second guest OS 133, and applications operating on the OS are not permitted to access the interrupt process monitoring device 150.

This is because the guest OSs (for example, the first guest OS 132 and the second guest OS 133) and application programs are not guaranteed to be as reliable as the privileged software 131. When the guest OS or application program or other software is permitted to access the interrupt process monitoring device 150 and if such software has defect or malicious intent, the desired process of interrupt process monitoring device 150 may not be executed.

The on-chip memory 130 has a working area (not shown) to be used when the privileged software 131, the first guest OS 132, or the second guest OS 133 works on the processor 120 described later. The on-chip memory 130 of the first embodiment includes a read-only memory (ROM) area in which the privileged software 131 is stored, and a random access memory (RAM) area in which the first guest OS 132 and the second guest OS 133 are stored, and which includes the working area. The on-chip memory 130 is not limited to such a structure, and may include any other storage unit used generally.

The privileged state managing device 190 constantly sends to the control unit 151 of the interrupt process monitoring device 150 a signal indicating whether the information processing apparatus 100 is in the privileged state or not. Specifically, the privileged state managing device 190 sends a signal indicating the privilege state to the control unit 151 when the privileged software 131 stored in the on-chip memory 130 is executed on the processor 120. The privileged state managing device 190 sends a signal indicating a non-privileged state to the control unit 151 when software other than the privileged software 131, such as the first guest OS 132 or the second guest OS 133, is executed on the processor 120.

Desirably, the privileged state managing device 190 is implemented as the hardware in order to avoid attack from malicious software.

The processor 120 includes a storage control unit 121, a control unit 122, an operation unit 123, a processor reset control unit 124, and the interrupt accepting unit 125. The privileged software 131, the first guest OS 132, the second guest OS 133, and application program (not shown) operate on the processor 120.

Figure 2:
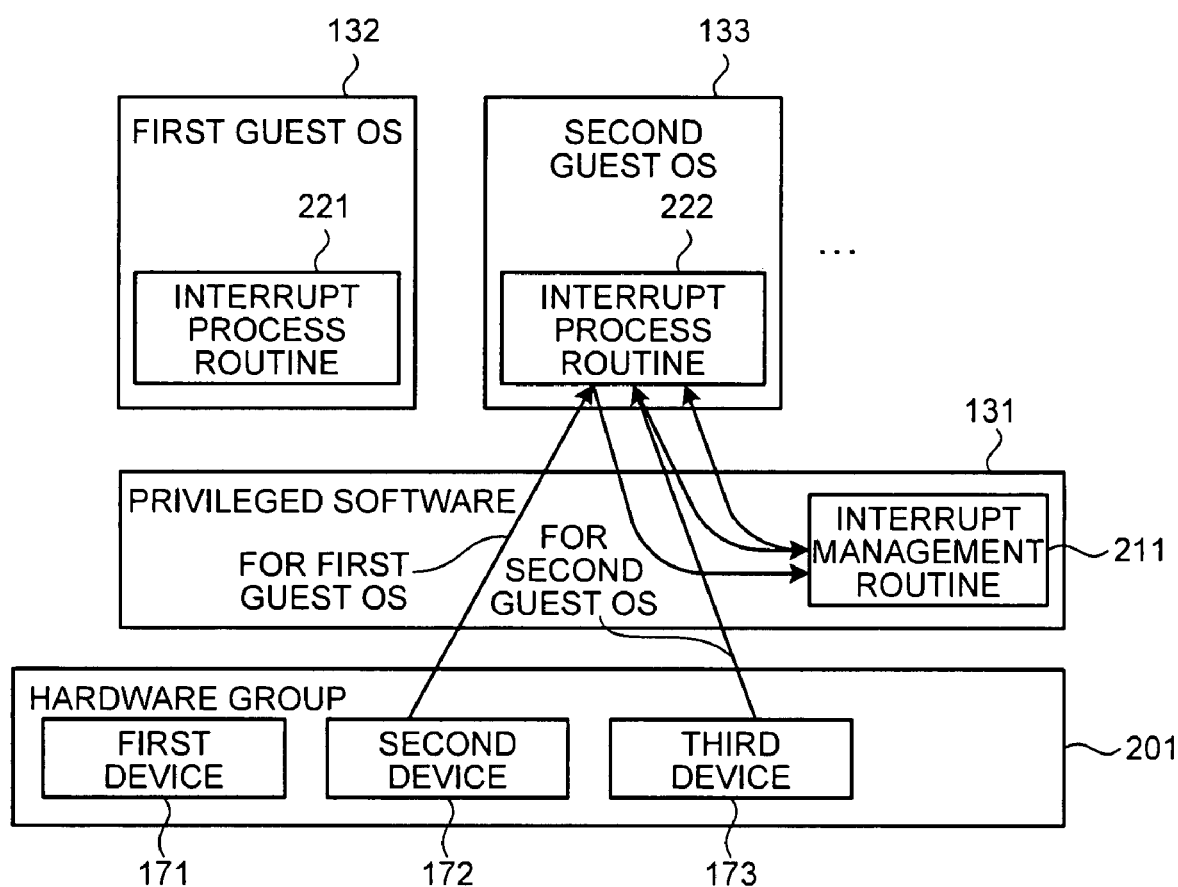
FIG. 2 is a diagram of a configuration of software operating on a processor.

As shown in FIG. 2, the privileged software 131 is arranged logically in a lower layer of the first guest OS 132 and the second guest OS 133. The first guest OS 132 has an interrupt process routine 221, and the second guest OS 133 has an interrupt process routine 222. The privileged software 131 has an interrupt management routine 211. In the first embodiment, the location of the privileged software 131 is not limited to the lower layer of the first guest OS 132 and the second guest OS 133, and for example, the privileged software 131 may be disposed in parallel with the first guest OS 132 and the second guest OS 133.

Referring to FIG. 2, an example of normal processing is explained in which hardware included in a hardware group 201 sends a signal indicating an interrupt. Assume that the second guest OS 133 is operating on the processor 120. When the second device 172 and the third device 173 send notification of interrupts while the second guest OS 133 is operating on the processor 120, the interrupt process routine 222 of the second guest OS 133 receives the notification. In the first embodiment, the second device 172 is controlled exclusively by the first guest OS 132, and the third device 173 is controlled exclusively by the second guest OS 133. In the example of FIG. 2, the interrupt process routine 222 is notified of an interrupt from a device which is controllable by the second guest OS 133 and an interruption from a device which is uncontrollable by the second guest OS 133.

The second guest OS 133 calls the privileged software 131 regardless of the controllability of the device which made the notified interrupt, and the software operating on the processor 120 is switched from the second guest OS 133 to the privileged software 131. Thus, the interrupt management routine 211 held by the privileged software 131 can recognize all the notified interrupts.

The privileged software 131 calls a guest OS capable of controlling the device which sends the interrupt, and makes the called guest OS operate on the processor 120. When the privileged software 131 determines that the guest OS operating before the software switching has received plural interrupts, the privileged software 131 selects a guest OS based on a preset order of priority of interrupts, for example. In the example shown in FIG. 2, the privileged software 131 calls the second guest OS 133 capable of controlling the third device 173. As a result, the interrupt process routine 222 of the second guest OS 133 controls the third device 173 according to the notification from the interrupt management routine 211.

Returning to FIG. 1, the control unit 122 controls an overall operation of the processor 120. The operation unit 123 performs an operation according to an instruction from the control unit 122.

The storage control unit 121 acquires an instruction from the on-chip memory 130 and the like based on an instruction from the control unit 122, or based on a result of operation in the operation unit 123. Further, the storage control unit 121 reads out data from, and writes data into the on-chip memory 130. Further, the storage control unit 121 accesses the devices 171 to 173 via device controllers 161 to 163, respectively.

The processor reset control unit 124, when receiving a reset request from the interrupt process monitoring device 150 described later, notifies the control unit 122 of the reset request, and resets the processor 120 regardless of the content of the process being executed on the processor 120.

The interrupt accepting unit 125 accepts an interrupt request of the devices 171 to 173 sent from the interrupt controller 140. According to the content of the interrupt, the interrupt accepting unit 125 gives an instruction to the control unit 122 to execute an instruction stored in a predetermined location in an interrupt vector table. Thereby, the software operating on the control unit 122 recognizes the generation of the interrupt.

Signals input to and output from the processor 120 include address signals and data signals supplied from the on-chip memory 130 and other devices through the on-chip bus 180, device interrupt notification signals supplied from the interrupt controller 140, and processor reset signals supplied from the interrupt process monitoring device 150 described later. Input/output ports for these signals are provided in any processor even if it does not incorporate the function for supporting virtualization.

It means that the interrupt process monitoring device 150 and the privileged state managing device 190 can be embedded into any information processing apparatus independent of the types and the numbers of input/output signals supported by a processor embedded in the information processing apparatus. In other words, any processor which does not incorporate the functions for supporting the virtualization can realize a delivery of an interrupt from a device to an appropriate guest OS, when the interrupt process monitoring device 150 and the privileged state managing device 190 are embedded into the information processing apparatus in the configuration as described above.

The interrupt controller 140 includes a device interrupt notification unit 141, a device interrupt processing unit 142, and a device interrupt setting unit 143. The interrupt controller 140 is connected to the interrupt process monitoring device 150 and the processor 120 through a dedicated line for interrupts. The interrupt controller 140 can notify the processor 120 and the interrupt process monitoring device 150 of the interrupt requests received from the device controllers 161 to 163.

In the first embodiment, the device controllers 161 to 163 and the interrupt controller 140 are connected through the line dedicated for interrupts as shown in FIG. 1, but they may be connected via the on-chip bus 180. Similarly, in the first embodiment, the interrupt controller 140, the processor 120, and the interrupt process monitoring device 150 are connected through the line dedicated for interrupts, but they may be connected via the on-chip bus 180.

The device interrupt setting unit 143 stores therein a setting for each device concerning whether to ignore the interrupt request from the devices 171 to 173 or not.

The device interrupt processing unit 142 is connected to the device controllers 161 to 163 which control the devices 171 to 173, respectively, through the line dedicated for interrupts. The device interrupt processing unit 142 receives interrupts from the device controllers 161 to 163 through the dedicated line for interrupts. The device interrupt processing unit 142 further includes a mechanism for checking which device has issued an interrupt request, and a mechanism for receiving a reply to the interrupt request, via the on-chip bus 180.

When the device interrupt processing unit 142 receives an interrupt request, the device interrupt notification unit 141 determines whether to ignore the interrupt request or not according to the setting stored in the device interrupt setting unit 143. On determining that the interrupt request is not to be ignored, the device interrupt notification unit 141 notifies the processor 120 and the interrupt process monitoring device 150 of the interrupt request.

The interrupt process monitoring device 150 includes the control unit 151, a timer 152, the timer-initial-value setting unit 153, and a processor reset signal generating unit 154.

The timer-initial-value setting unit 153 receives an initial-value setting request for the timer 152 described later from the privileged software 131 operating on the processor 120. Then, the timer-initial-value setting unit 153 notifies the control unit 151 described later of the reception of the initial-value setting request, and sets an initial value of the timer 152 according to an instruction from the control unit 151. The initial value to be set by the timer-initial-value setting unit 153 is a value included in the initial-value setting request.

The timer 152 is controlled by the control unit 151. In the first embodiment, the timer 152 is a count-down timer which monotonously decreases a count value from an initial value (positive value) preset by the timer-initial-value setting unit 153 to zero. The type of the timer 152 is not limited to the count-down type, and the timer 152 may be a count-up timer which monotonously increases the count value from zero to a preset initial value (positive value).

The control unit 151 includes a detecting unit 155, and a judging unit 156, and controls an overall operation of the interrupt process monitoring device 150. The control unit 151 executes processing depending on: the interrupt notification from the interrupt controller 140; whether the information processing apparatus 100 is in the privileged state or not; the count value of the timer 152; the initial value of the timer preset by the timer-initial-value setting unit 153, and whether the initial-value setting request has been sent to the timer-initial-value setting unit 153 or not. The control unit 151 holds state information of the interrupt process monitoring device 150.

The detecting unit 155 detects the interrupts from the devices 171 to 173 based on the interrupt notification from the interrupt controller 140.

The judging unit 156 judges whether the software operating on the processor 120 has called the privileged software 131 or not when the count value of the timer 152 reaches zero. The judging unit 156 judges that the privileged software 131 has been called when it has been notified from the timer-initial-value setting unit 153 that the timer-initial-value setting device 153 has received a timer-initialization request from the privileged software 131 operating on the processor 120. The detailed procedure of the judging is explained later.

The processor-reset-signal generating unit 154 sends a signal of processor reset request to the processor reset control unit 124 of the processor 120 according to an instruction from the control unit 151.

Figure 3:
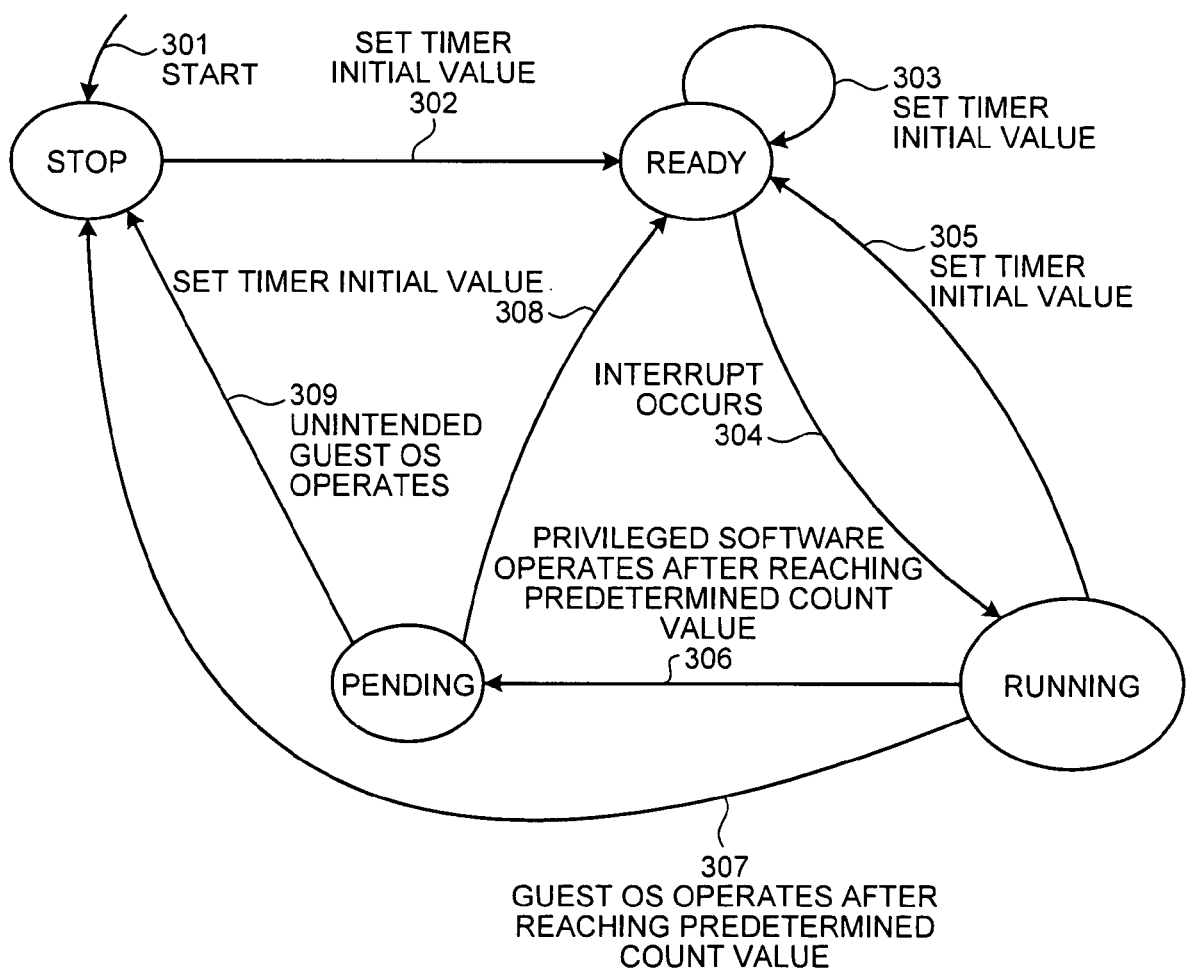
FIG. 3 is shows state transition of a timer managed by an interrupt process monitoring device.

The control unit 151 manages the state information of the interrupt process monitoring device 150. As shown in FIG. 3, four states are set as the state information, i.e., stop state, ready state, running state, and pending state.

State transition occurs according to: the interrupt notification from the interrupt controller 140; a signal sent from the privileged state managing device 190 indicating whether the information processing apparatus 100 is in the privileged state or not; the operating state of the timer 152; and the notification of timer-initial-value setting request by the privileged software 131 from the timer-initial-value setting unit 153. Each of the states shown in FIG. 3, the state transition, and the conditions for state transition are explained below.

In the stop state, the timer 152 is not operating, and has not been initialized. The control unit 151 sets the stop state as the state information of the interrupt process monitoring device 150 when the information processing apparatus 100 is activated (transition of reference numeral 301). Further, the control unit 151 sets the stop state as the state information of the interrupt process monitoring device 150 when the processor 120 is reset as a result of the generation of the processor reset signal by the processor-reset-signal generating unit 154 while the interrupt process monitoring device 150 is in the running state or in the pending state (transition of reference numeral 307 and reference numeral 309).

The control unit 151, when notified from the timer-initial-value setting unit 153 that the initial-value setting request of the timer 152 has been sent from the privileged software 131 while the interrupt process monitoring device 150 is in the stop state, instructs the timer-initial-value setting unit 153 to set the initial value of the timer 152, and sets the state information of the interrupt process monitoring device 150 in the ready state (transition of reference numeral 302). As a result, the initial value is set in the timer 152. The initial value is a value indicating a time allowed to pass from the interrupt process monitoring device 150 is notified of the device interrupt until the privileged software 131 starts execution on the processor 120. For example, if the privileged software 131 has not been called at the time when the timer 152 finishes counting from the initial value to zero, the judging unit 156 judges that the processor 120 is to be reset.

The ready state is a state in which the timer-initial-value setting unit 153 finishes setting the initial value of the timer 152, and the timer 152 is ready to start counting. In the ready state, though the initial value of the timer 152 is set, the timer 152 has not started counting. If the control unit 151 receives a notification from the timer-initial-value setting unit 153 that the timer-initial-value setting request is sent from the privileged software 131 while the interrupt process monitoring device 150 is in one of the stop state, running state, pending state, and ready state, the control unit 151 instructs the timer-initial-value setting unit 153 to set the initial value in the timer 152, and sets the state information of the interrupt process monitoring device 150 in the ready state (transition of reference numeral 302, reference numeral 305, reference numeral 308, and reference numeral 303). With the transitions indicated by reference numeral 302, reference numeral 305, reference numeral 308, and reference numeral 303, the initial value of the timer 152 is set.

When the control unit 151 receives a notification from the interrupt controller 140 that the interrupt occurs while the interrupt process monitoring device 150 is in the ready state, the control unit 151 makes the timer 152 start counting, and sets the state information of the interrupt process monitoring device 150 in the running state (transition of reference numeral 304).

The running state is a state in which the timer 152 is counting down, and the count value has not reached zero. Since the time set as initial value has not elapsed, the processor-reset-signal generating unit 154 has not generated the processor reset signal.

When the timer 152 is a count-down timer which starts counting down from the preset initial value as in the first embodiment, the timer 152 continues to count down according to periodic input signals such as clock until the count value reaches zero.

When the judging unit 156 judges that the privileged software 131 is operating on the processor 120 at the time the count value of the timer 152 reaches zero (i.e., when the preset time has passed) while the state information of the interrupt process monitoring device 150 is set to the running state, the control unit 151 sets the state information of the interrupt process monitoring device 150 in the pending state (transition of reference numeral 306). The judging unit 156 can judge if the privileged software 131 is operating on the processor or not based on the notification which is sent from the privileged state managing device 190 to indicate whether the information processing apparatus 100 is in the privileged state or not. In the transition of reference numeral 306, the control unit 151 instructs the timer 152 to stop counting.

When the judging unit 156 judges that the privileged software 131 is not operating on the processor 120 at the time the count value of the timer 152 reaches zero while the state information of the interrupt process monitoring device 150 is set to the running state, the control unit 151 sets the state information of the interrupt process monitoring device 150 in the stop state (transition of reference numeral 307). In the transition of reference numeral 307, the control unit 151 instructs the timer 152 to stop counting, and also instructs the processor-preset-signal generating unit 154 to send out processor-reset-request signal to the processor reset control unit 124. As a result, the processor 120 is reset.

The pending state is a state in which the generation of the processor reset signal is suppressed after the preset time has elapsed.

When the control unit 151 is notified from the timer-initial-value setting unit 153 that the initial-value setting request for the timer 152 made by the privileged software 131 has been received, while the state information of the interrupt process monitoring device 150 is the pending state, the state information of the interrupt process monitoring device 150 is set in the ready state (transition of reference numeral 308), and the timer-initial-value setting unit 153 is instructed to set the initial value in the timer 152. As a result, the initial value is set in the timer 152.

When the judging unit 156 judges that software other than the privileged software 131 is operating on the processor 120 (i.e., that the information processing apparatus is not in the privileged state) although the timer-initial-value setting unit 153 has not received the initial-value setting request for the timer 152, while the state information of the interrupt process monitoring device 150 is in pending state, the control unit 151 instructs the processor-reset-signal generating unit 154 to send out the processor reset signal, and sets the state information of the interrupt process monitoring device 150 in the stop state (transition of reference numeral 309). As a result, the processor 120 is reset.

Processing procedure executed by the interrupt process monitoring device 150 is explained below with reference to FIG. 4. In the processing procedure shown in FIG. 4, after the information processing apparatus 100 is powered on, the control unit 151 initially sets the state information of the interrupt process monitoring device 150 in the stop state (step S401).

The timer-initial-value setting unit 153 of the interrupt process monitoring device 150 determines if the timer-initial-value setting request has been received or not from the privileged software 131 operating on the processor 120 (step S402). On determining that the request has not been received (No at step S402), the timer-initial-value setting unit 153 continues the detection process of timer-initial-value setting request (step S402).

On determining that the timer-initial-value setting request has been received (Yes at step S402), the timer-initial-value setting unit 153 notifies the control unit 151 of the reception of the initial-value setting request for the timer 152. In response to the notification, the control unit 151 instructs the timer-initial-value setting unit 153 to set the initial value of the timer 152 (step S403). The control unit 151 sets the state information of the interrupt process monitoring device 150 in the ready state (step S404).

The detecting unit 155 performs a detection process of a notification signal indicating the interrupt of a device transmitted from the interrupt controller 140 (step S405). When the detecting unit 155 does not detect the notification signal indicating the device interrupt (No at step S405), the detecting unit 155 continues the detection process of the notification signal (step S405), When the detecting unit detects the notification signal indicating the device interrupt (Yes at step S405), the control unit 151 instructs the timer 152 to operate, and the timer 152 starts the operation (step S406). In the first embodiment, the timer counts down from the initial value. Thus, the lapse of time from the detection of interrupt signal can be counted.

When the control unit 151 makes the timer 152 start counting, the control unit 151 sets the state information of the interrupt process monitoring device 150 in the running state (step S407). Then, the control unit 151 determines if the control unit 151 has been notified that the timer-initial-value setting unit 153 has received the timer-initial-value setting request from the privileged software 131 operating on the processor 120 (step S408). If the control unit 151 determines that it has been notified of the reception of the timer-initial-value setting request by the timer-initial-value setting unit 153 (Yes at step S408), the control unit 151 instructs the timer 152 to stop counting. As a result, counting of the timer 152 stops (step S409). The control unit 151 instructs the timer-initial-value setting unit 153 to set the initial value of the timer 152 (step S403).

When the control unit 151 determines that it has not been notified of the reception of the timer-initial-value setting request by the timer-initial-value setting unit 153 (No at step S408), the control unit 151 determines whether a predetermined time has passed since the detection of the notification indicating the device interrupt (step S410). The control unit 151 can make this determination by determining whether the count value of the timer 152 starting from the initial value has reached zero or not.

On determining that the predetermined time has not passed (No at step S410), the control unit 151 determines again whether the timer-initial-value setting unit 153 has received the initial-value setting request for the timer 152 or not (step S408).

On determining that the predetermined time has passed (Yes at S410), the control unit 151 makes the timer 152 stop counting (step S411).

The judging unit 156 judges if the software operating on the processor 120 is the privileged software 131 or not (step S412). The judging unit 156 can determine based on the signal from the privileged state managing device 190.

On determining that the privileged software 131 is operating on the processor 120 (Yes at step S412), the control unit 151 sets the state information of the interrupt process monitoring device 150 in the pending state (step S413).

Afterwards, the control unit 151 determines if the timer-initial-value setting unit 153 has received the initial-value setting request for the timer 152 or not from the privileged software 131 operating on the processor 120 (step S414). On determining that the timer-initial-value setting unit 153 has not received the initial-value setting request for the timer 152 (No at step S414), the control unit 151 determines again whether the privileged software 131 is operating on the processor 120 or not (step S412).

On determining that the software operating on the processor 120 is not the privileged software 131 (No at step S412), the control unit 151 instructs the processor-reset-signal generating unit 154 to transmit a signal requesting processor reset to the processor reset control unit 124. As a result, the processor 120 is reset (step S415).

After the processor 120 is reset, the control unit 151 sets the state information of the interrupt process monitoring device 150 in the stop state (step S401). The processes in step S402 and the subsequent steps are executed again.

By this process, the processor 120 can be reset when the devices 171 to 173 generate the interrupt request and the privileged software 131 is not called within a predetermined time.

The process executed by components of the information processing apparatus 100 in the first embodiment is explained in detail with reference to sequence diagrams. In FIGS. 5 to 8, the length of a vertical line segment indicates the lapse of time. Arrows indicated among the third device 173, the interrupt controller 140, the processor 120, and the interrupt process monitoring device 150 show communication exchanged among these components.

Below the box labeled as "processor 120" in FIGS. 5 to 8, the software operating on the processor is shown. The third device 173 and the interrupt controller 140 communicate with each other via the third device controller 163, though not shown in the drawings. Below the box labeled as "interrupt process monitoring device 150", the state information of the interrupt process monitoring device 150 is shown.

FIGS. 5 to 8 show communications exchanged after the information processing apparatus 100 is powered on. The initial value of the state information managed by the interrupt process monitoring device 150 is the stop state. The software operating on the processor 120 at the beginning is the privileged software 131.

The processing procedure shown in FIGS. 5 to 8 is not a process performed only after the information processing apparatus 100 is turned on, and may be performed appropriately during the running of the information processing apparatus 100. In the processing procedure shown in FIGS. 5 to 8, the state information managed by the interrupt process monitoring device 150 is supposed to be initially set in the stop state, but the initial state information is not limited to the stop state.

In the processing procedure shown in FIGS. 5 to 8, the interrupt controller 140 is set so as not to ignore the interrupt notified from the third device controller 163.

Figure 5:
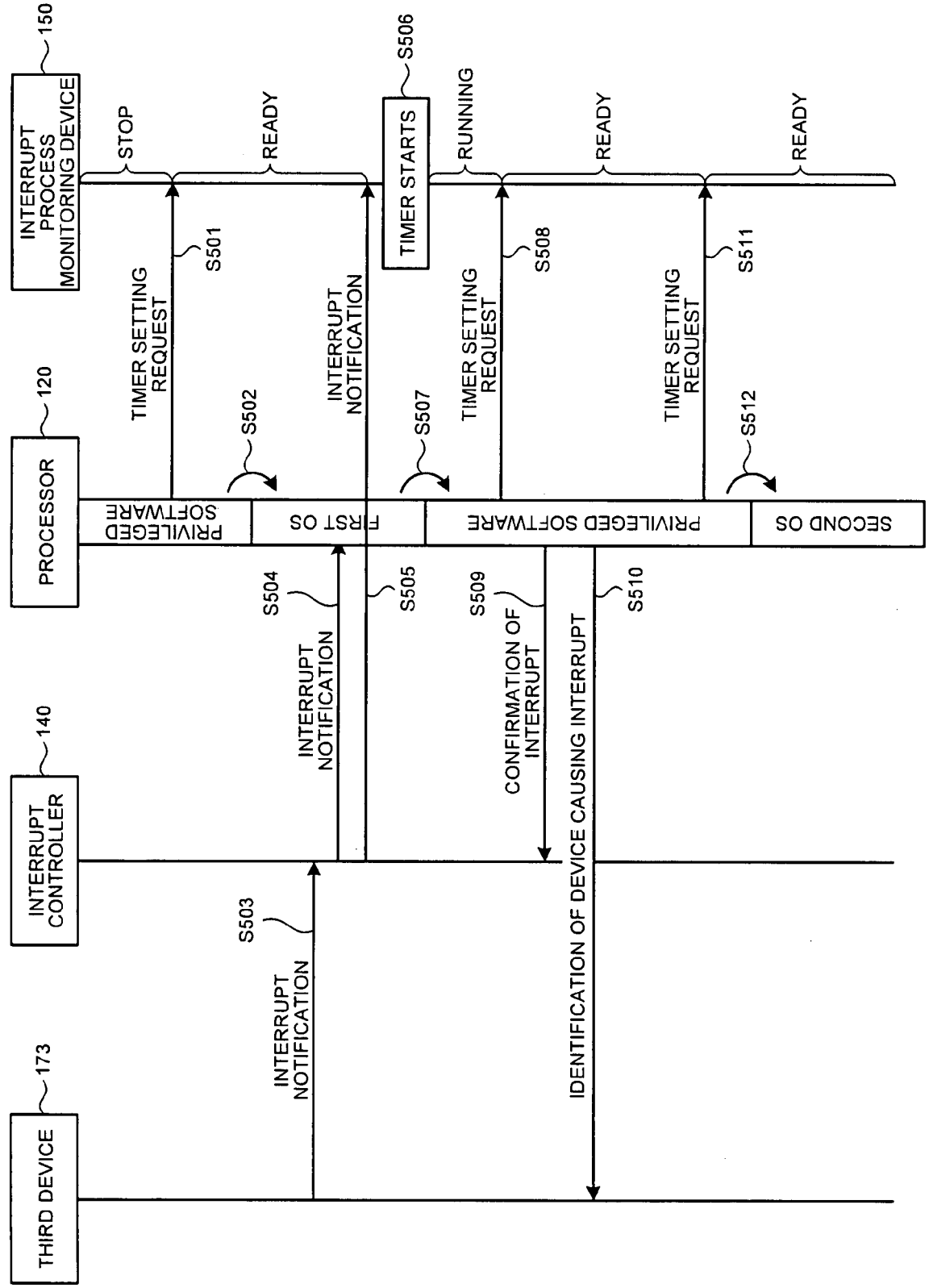
FIG. 5 is a sequence diagram of a first example of a communication procedure among devices of the information processing apparatus.

The sequence diagram of FIG. 5 shows a case in which the timer-initial-value setting unit 153 receives the initial-value setting request for the timer from the privileged software 131 within a predetermined time after the third device 173 gives a notification indicating the interrupt.

First, the privileged software 131 operating on the processor 120 transmits the initial-value-setting request for the timer 152 to the timer-initial-value setting unit 153 of the interrupt process monitoring device 150 (step S501). Then, the timer-initial-value setting unit 153 notifies the control unit 151 of the reception of the initial-value setting request. The control unit 151 instructs the timer-initial-value setting unit 153 to set the initial value in the timer, and the timer-initial-value setting unit 153 sets the initial value in the timer 152, accordingly. The control unit 151 changes the state information of the interrupt process monitoring device 150 from the stop state to the ready state. This process corresponds to the process at step S402 to step S404 shown in FIG. 4.

The privileged software 131 must set sufficient time as the initial value of the timer 152, so that there is enough time to transfer the control over to the privileged software 131 after the first guest OS 132 or the second guest OS 133 detects the interrupt. This is because, if a very short time is set as the initial value, the first guest OS 132 or the like may not be able to call the privileged software 131 within a set time even if the first guest OS 132 or the like is not defective or malicious. Then, the first guest OS 132 or the like may not operate normally. On the other hand, if a very long time is set as the initial value, and the first guest OS 132 or the like has malicious intent, such software may be given a sufficient time for making unjust process.

When the timer-initial-value setting unit 153 can accept an arbitrary value as the initial value of the timer 152, the initial value to be specified may be determined, for example, in consideration of interrupt response time of each guest OS (i.e., time from the notification of interrupt till the notification to the privileged software), or depending on the type or feature of a device (which might affect the length of the interrupt response time).

Returning to the process, the privileged software 131 operating on the processor 120 calls the first guest OS 132, and changes the software operating on the processor 120 to the first guest OS 132 (step S502). As a result, the first guest OS 132 starts to operate. At this time, the notification from the privileged state managing device 190 is changed to the one indicating that the information processing apparatus 100 is not in the privileged state. Here, even though the notification indicating the privileged state/non-privileged state sent from the privileged state managing device 190 changes, the control unit 151 maintains the ready state as the state information of the interrupt process monitoring device 150, since the signal of interest in the ready state does not change.

The third device 173 notifies the interrupt controller 140 of interrupt request via the third device controller 163 (step S503).

After confirming that the interrupt controller 140 is set so as not to ignore the interrupt notified from the third device controller 163 based on the information stored in the device interrupt setting unit 143, the interrupt controller 140 notifies the processor 120 of the interrupt request (step S504).

The interrupt controller 140 also notifies the interrupt process monitoring device 150 of the occurrence of the interrupt, substantially simultaneously with the notification in step S504 (step S505). As a result, the control unit 151 of the interrupt process monitoring device 150 makes the timer 152 start operation (step S506). Further, the control unit 151 changes the managed state information from the ready state to the running state in response to the notification of the occurrence of the device interrupt from the interrupt controller 140.

Figure 4:
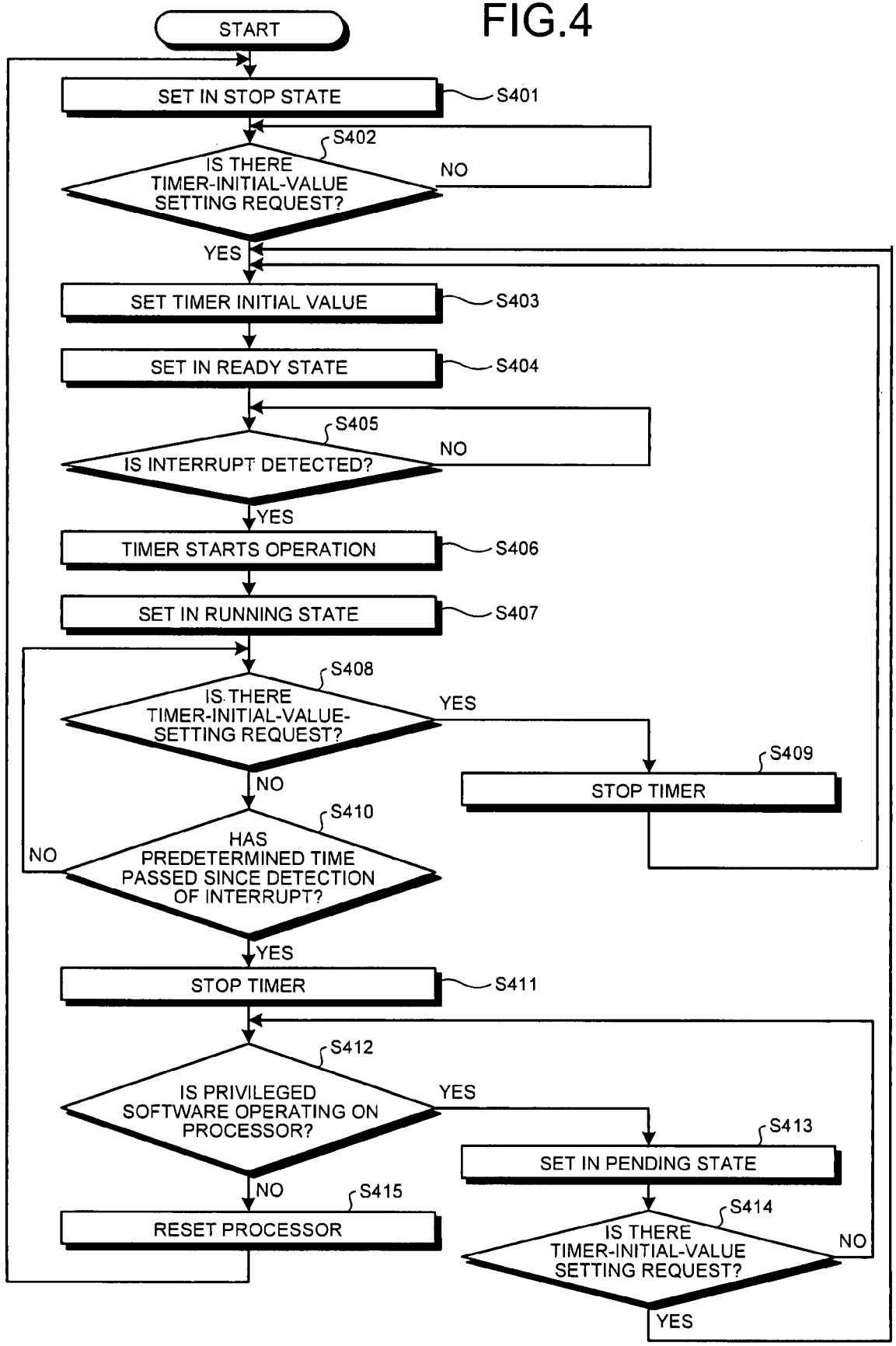
FIG. 4 is a flowchart of a processing procedure of the interrupt process monitoring device.

The process after the reception of the notification of the occurrence of interrupt corresponds to the process at step S405 to step S407 in FIG. 4.

On receiving the interrupt request from the interrupt controller 140, the interrupt accepting unit 125 of the processor 120 instructs the control unit 122 to execute an instruction for the interrupt process. With this instruction, an instruction sequence being executed by the first guest OS 132 is forcibly changed to an instruction sequence dedicated for the device interrupt. The first guest OS 132 then calls the privileged software 131, which is previously set for the notification of the interrupt process, so as to notify the privileged software 131 of the notification of the interrupt. As a result, the software operating on the processor 131 is changed from the first guest OS 132 to the privileged software 131 (step S507). In this process, the signal notified by the privileged state managing device 190 is changed to the one indicating that the information processing apparatus 100 is in the privileged state. The control unit 151, however, maintains the running state as the state information of the interrupt process monitoring device 150 since the signal monitored by the control unit 151 in the running state does not change.

Different from the processor 120 in the first embodiment, in the processor for general computers having protection mechanism of interrupt vectors, the latter half of the process shown in step S507, that is, change from the first guest OS to the privileged software, is executed forcibly by the hardware implemented in the processor. Accordingly, complete management of interrupts by the privileged software is realized. In the first embodiment, by contrast, the processor 120 is not provided with such a function, being a processor conventionally embedded and used in the system LSI, SoC or the like. In such a processor, the control is not transferred to the privileged software 131 unless the first guest OS 132 or the like calls the privileged software 131 in an explicit manner.

The privileged software 131 notified of the occurrence of interrupt from the first guest OS 132 sends the timer-initial-value setting unit 153 of the interrupt process monitoring device 150 the initial-value-setting request for the timer 152 so that the timer 152 is stopped and the next interrupt can be detected at any time (step S508). The control unit 151 instructs to stop the timer 152, and instructs the timer-initial-value setting unit 153 to set the initial value of the timer 152.

Here, the notification of the initial-value-setting request for the timer 152 from the privileged software 131 is supposed to be accepted before the count value of the timer 152 becomes zero. Since the timer-initial-value setting unit 153 receives the initial-value-setting request within a predetermined time, the control unit 151 changes the state information of the managed interrupt process monitoring device 150 from the running state to the ready state. The process after the reception of the notification of the initial-value-setting request of the timer 152 corresponds to the process in steps S408, S409, S403 and S404 in FIG. 4.

The privileged software 131 operating on the processor 120 confirms the interrupt request with the interrupt controller 140 (step S509). Further, the privileged software 131 performs processes, such as transmission/reception of signals to/from the third device 173, as necessary, for identifying the device causing interrupt (step S510). Thus, the privileged software 131 identifies the device causing interrupt and the software exclusively using this device or responsible for processing. In the processing procedure shown in FIG. 5, the identified software is the second guest OS 133. In these processes, the signal monitored by the control unit 151 does not change, and the state information of the interrupt process monitoring device 150 managed by the interrupt process monitoring device 150 is maintained in the ready state.

Afterwards, the privileged software 131 notifies the timer-initial-value setting unit 153 of the interrupt process monitoring device 150 of the initial-value-setting request for the timer 152 (step S511). When the timer-initial-value setting unit 153 receives the initial-value-setting request for the timer 152, the state information of the interrupt process monitoring device managed by the control unit 151 is the ready state, and the signal monitored by the control unit 151 in the ready state does not change. Therefore, the state information is maintained in the ready state.

When the privileged software 131 operating on the processor 120 calls the second guest OS 133, the software operating on the processor 120 is changed from the privileged software 131 to the second guest OS 133 which is responsible for processing of the third device 173 (step S512). By this process, the signal notified by the privileged state managing device 190 changes to the one indicating that the information processing apparatus 100 is not in the privilege state. However, since the signal monitored by the control unit 151 does not change, the state information of the interrupt process monitoring device 150 managed by the control unit 151 is maintained in the ready state.

Figure 6:
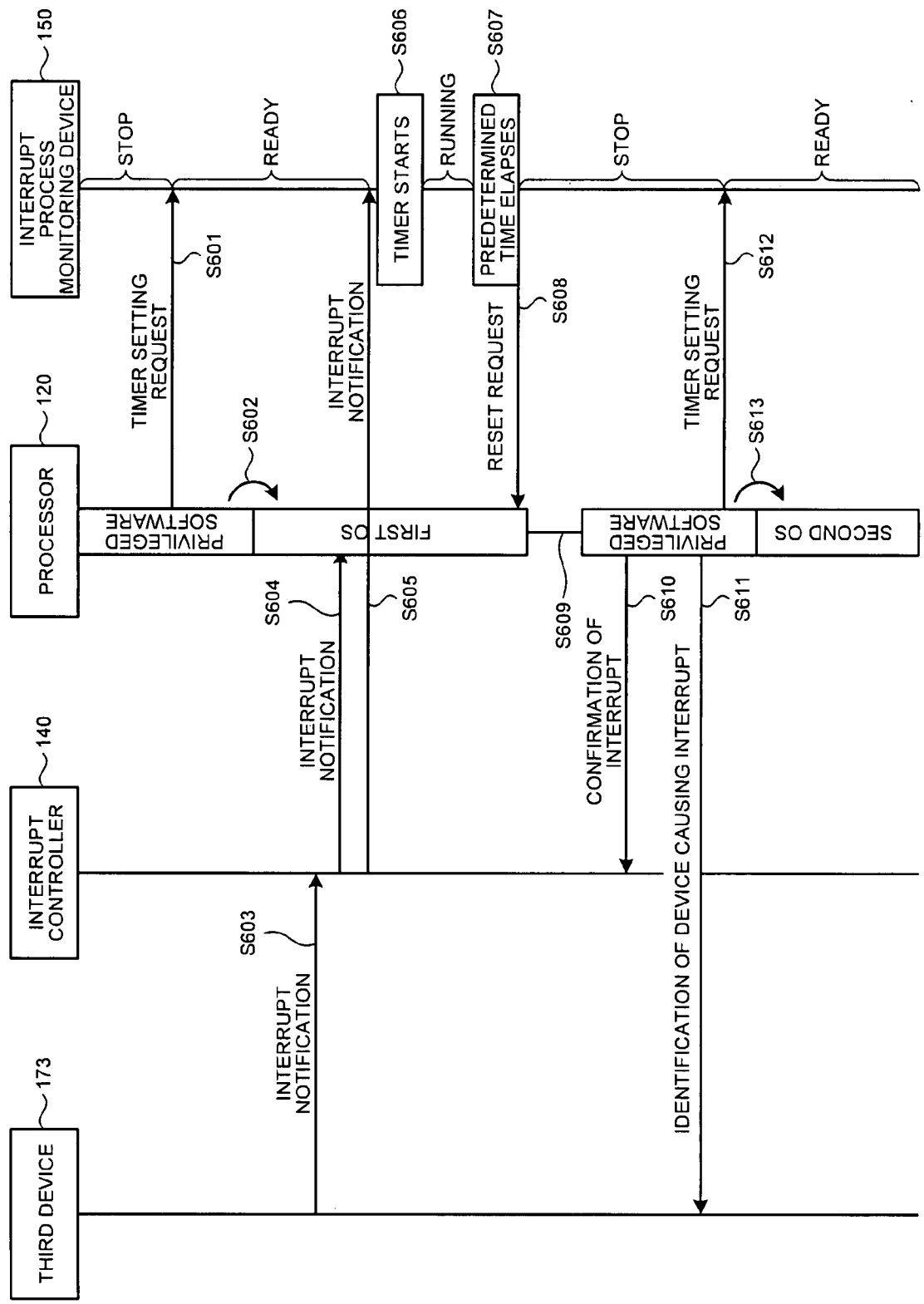
FIG. 6 is a sequence diagram of a second example of the communication procedure among devices of the information processing apparatus.

In the sequence diagram show in FIG. 6, the operating software is not changed from the first guest OS 132 to the privileged software 131 due to trouble in the first guest OS 132. In this example, though a predetermined time has passed since the notification of the interrupt request from the third device 173, the timer-initial-value setting unit 153 does not receive the initial-value-setting request for the timer 152 from the privileged software 131, and the first guest OS 132 remains operating.

Process in steps S601 to S606 in FIG. 6 is the same as the process in steps S501 to S506 in FIG. 5, and the explanation thereof is not repeated.

The control unit 151 determines that the predetermined time has passed since the reception of the notification of the occurrence of the interruption by detecting that the count value of the timer 152 has become zero (step S607). Then, the control unit 151 stops the counting of the timer 152.

During the process of step S607 in FIG. 6, the privileged state managing device 190 keeps sending the signal indicating that the information processing apparatus 100 is not in the privileged state. Thus, the judging unit 156 can judge that the software operating on the processor 120 is not changed to the privileged software 131.

The control unit 151 of the interrupt process monitoring device 150 instructs the processor-reset-signal generating unit 154 to generate a processor reset signal (step S608), thereby resetting the processor 120. As a result, the first guest OS 133 having a trouble can be terminated forcibly.

After resetting the processor 120, the control unit 151 changes the state information of the managed interrupt process monitoring device 150 from the running state to the stop state. The process after detecting that the count value of the timer 152 has become zero corresponds to the process at steps S410, S411, S412, S415, and S401 in FIG. 4.

The processor 120 is restarted after resetting and starts executing the privileged software 131 (step S609). As a result, the privileged software 131 can check the interrupts not notified from the first guest OS 132.

The process in steps S610 to S613 in FIG. 6 is the same as the process in steps S509 to S512 in FIG. 5, and the explanation thereof is not repeated.

Figure 7:
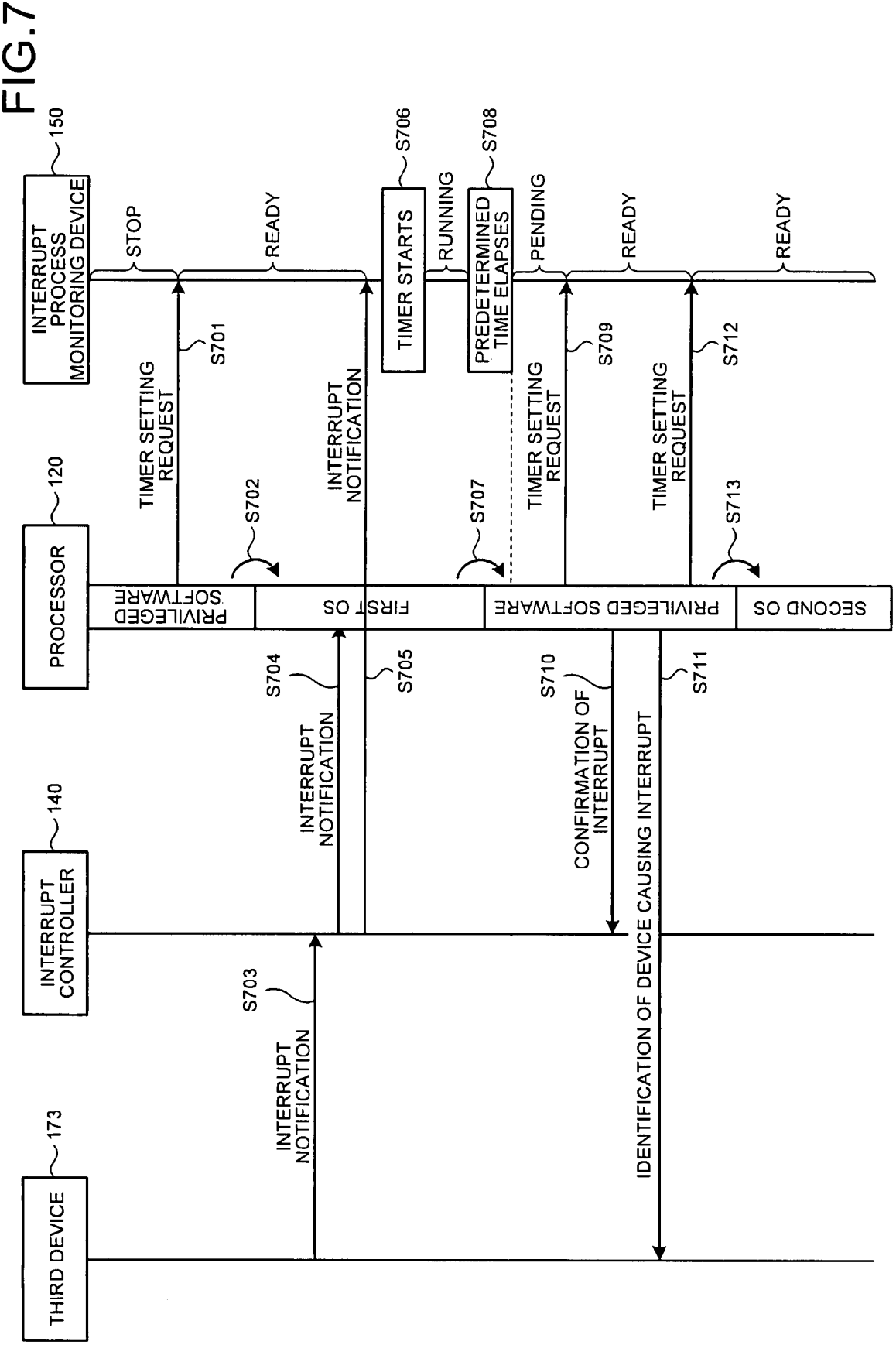
FIG. 7 is a sequence diagram of a third example of the communication procedure among devices of the information processing apparatus.

The sequence diagram in FIG. 7 shows an example in which the control unit 151 sets the state information of the managed interrupt process monitoring device 150 in the pending state in order to prevent unstable operations at a time the software operating on the processor 120 changes. In the example, though the operating software is changed from the first guest OS 132 to the privileged software 131, the privileged software 131 sends the initial-value-setting request for the timer 152 to the timer-initial-value setting unit 153 late. As a result, a predetermined time passes after the notification of the interrupt from the third device 173.

The process in steps S701 to S706 in FIG. 7 is the same as the process in steps S501 to S506 in FIG. 5, and the explanation thereof is not repeated.

When the first guest OS 132 operating on the processor 120 calls the privileged software 131, the software operating on the processor 120 is changed from the first guest OS 132 to the privileged software 131 (step S707). Process of software changing is the same as that explained with reference to FIG. 5, and the explanation thereof is not repeated.

Though the software operating on the processor 120 is changed from the first guest OS 132 to the privileged software 131, the count value of the timer 152 reaches zero before the privileged software 131 sends the initial-value-setting request for the timer 152 to the timer-initial-value setting unit 153. As a result, the control unit 151 determines that the predetermined time has passed since the occurrence of interrupt (step S708). Then the control unit 151 instructs the timer 152 to stop operation. These processes correspond to steps S410 to S411 in FIG. 4.

The control unit 151 can recognize that the information processing apparatus 100 is in the privileged state, i.e., that the privileged software 131 is operating on the processor, based on the notification from the privileged state managing device 190.

Accordingly, the control unit 151 changes the state information of the interrupt process monitoring device 150 managed by the control unit 151 from the running state to the pending state. In the pending state, the control unit 151 does not give a processor-reset-signal generation request to the processor-reset-signal generating unit 154. These processes correspond to steps S412 to S413 in FIG. 4.

The privileged software 131 notified of the occurrence of interrupt by the first guest OS 312 sends the initial-value-setting request for the timer 152 to the timer-initial-value setting unit 153 (step S709). The control unit 151 is notified of the reception of the request by the timer-initial-value setting unit 153, and instructs the timer-initial-value setting unit 153 to set the initial value of the timer 152 as well as changes the state information of the managed interrupt process monitoring device 150 from the pending state to the ready state.

The process in steps S710 to S713 in FIG. 7 is the same as the process in steps S509 to S512 in FIG. 5, and the explanation thereof is not repeated.

Figure 8:
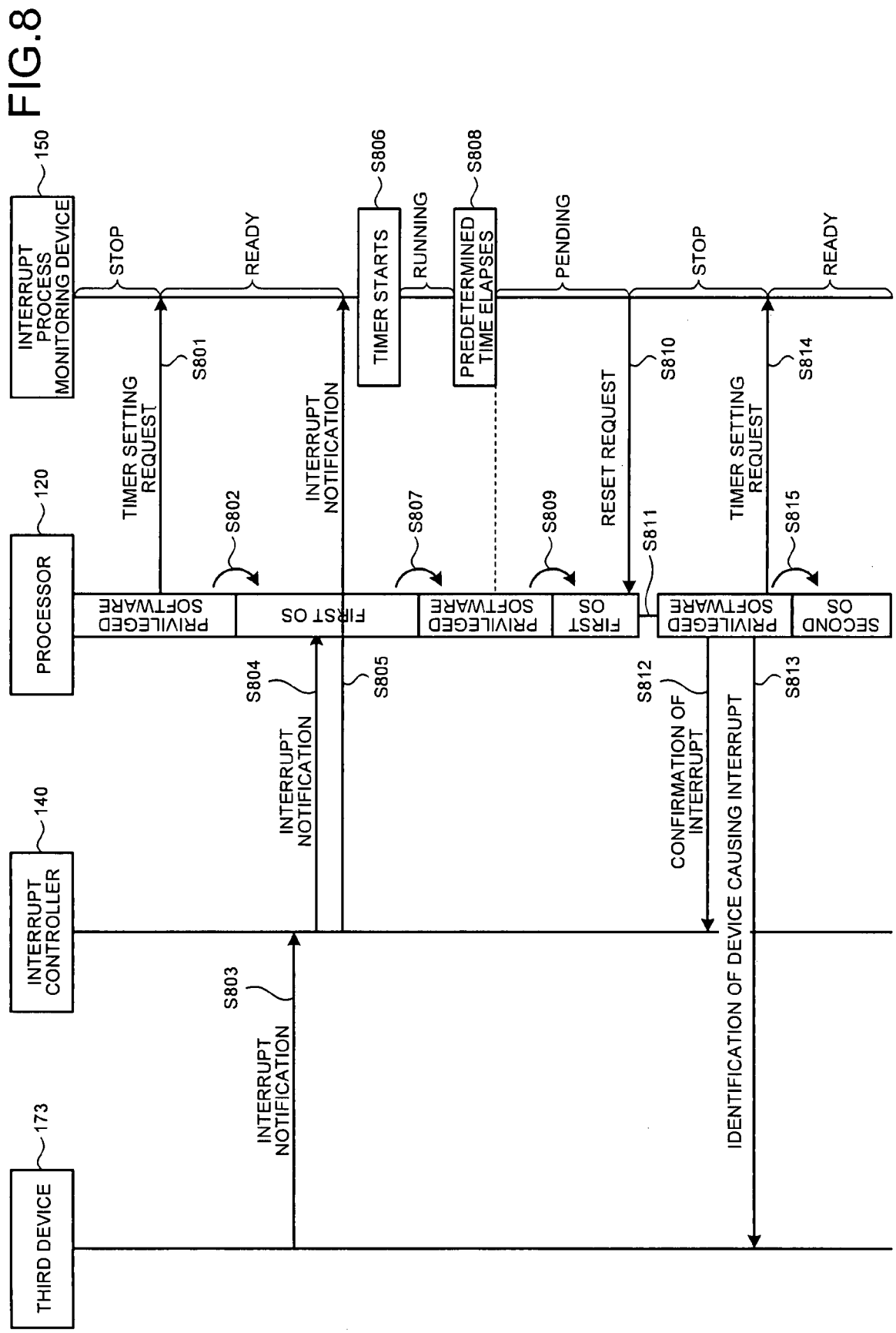
FIG. 8 is a sequence diagram of a fourth example of the communication procedure among devices of the information processing apparatus.

The sequence diagram in FIG. 8 shows an example in which after the state information of the interrupt process monitoring device 150 managed by the control unit 151 is set to the pending state, the first guest OS 132 does not call the privileged software 131 in a predetermined manner to notify the interruption, in other words, the first guest OS 132 performs an unjust operation, and the privileged software 131 does not request the initial value setting of the timer 152 to the timer-initial-value setting unit 153. In the example, though the software operating on the processor 120 is changed from the first guest OS 132 to the privileged software 131 after the notification of the interrupt from the third device 173, the software operating on the processor 120 is changed again from the privileged software 131 to the first guest OS 132 before the request is sent for the initial value setting of the timer 152.

The process in steps S801 to S806 in FIG. 8 is the same as the process in steps S501 to S506 in FIG. 5, and the explanation thereof is not repeated.

The first guest OS 132 operating on the processor 120 does not notify the occurrence of the interrupt to the privileged software 131 in a manner of privileged calling which is predetermined for the notification of the interrupt process, though the first guest OS 132 recognizes the occurrence of the interrupt. Instead, the first guest OS 132 calls the privileged software 131 by performing a privileged calling in a different manner. The reason why the first guest OS 132 performs such processing can be that the first guest OS 132 is malicious or that the first guest OS 132 has some trouble.

As a result, the software operating on the processor 120 is changed from the first guest OS 132 to the privileged software 131 (step S807). The signal sent from the privileged state managing device 190 to indicate whether the information processing device 100 is in the privileged state or not is changed to a signal indicating the privileged state because the privileged software 131 is operating.

Then, suppose that the count value of the timer 152 reaches zero. As a result, the control unit 151 determines that the predetermined time has passed since the occurrence of interrupt (step S808). Therefore the control unit 151 instructs the timer 152 to stop operation. These processes correspond to steps S410 to S411 in FIG. 4.

At this time, the control unit 151 can recognize that the information processing apparatus 100 is in the privileged state, in other words, that the privileged software 131 is operating on the processor 120, based on the notification from the privileged state managing device 190.

Accordingly, the control unit 151 changes the state information of the managed interrupt process monitoring device 150 from the running state to the pending state. These processes correspond to steps S412 to S413 in FIG. 4.

Though the privileged software 131 is called by the first guest OS 132, the calling is not for notifying the interrupt process. Therefore, the privileged software 131 does not request initial value setting of the timer 152 to the timer-initial-value setting unit 153, and returns the process to the first guest OS 132 on finishing the called process (step S809).

When the software operating on the processor 120 is changed from the privileged software 131 to the first guest OS 132, the signal sent from the privileged state managing device 190 to indicate whether the information processing apparatus 100 is in the privilege state or not is changed to the one indicating that the information processing apparatus 100 is not in the privilege state, and the control unit 151 can recognize that the information processing apparatus 100 is not in the privilege state. This process corresponds to the process in step S412 in FIG. 4.

After recognizing that the information processing apparatus 100 is not in the privileged state, the control unit 151 instructs the processor-reset-signal generating unit 154 to generate a processor reset signal, and the processor-reset-signal generating unit 154 generates a processor reset signal (step S810). As a result, the processor 120 is reset.

After the reset of the processor 120, the control unit 151 changes the state information of the managed interrupt process monitoring device 150 from the pending state to the stop state. The process after the instruction with the processor reset signal corresponds to the process in steps S415 and S401 in FIG. 4.

In the processing procedure shown in FIG. 8, since the pending state exists as the state information of the interrupt process monitoring device 150 managed by the control unit 151, even if the time has passed longer than the predetermined time, the processor 120 can be reset securely without overlooking troubles occurring in the first guest OS 132 or the second guest OS 133.

The processor 120 is restarted after the reset, and starts executing the privileged software 131 (step S811). As a result, the privileged software 131 can check an interrupt not notified from the first guest OS 132.

The process in steps S812 to S815 in FIG. 8 is the same as the process from steps S509 to S512 in FIG. 5, and the explanation thereof is not repeated.

By this processing procedure, even if the occurrence of interrupt induced by the devices 171 to 173 is not notified to the privileged software 131 due to malicious intent or defect of the guest OS, the processor 120 is reset by the interrupt process monitoring device 150 in a predetermined time. Further, since the privileged software 131 is executed when the processor 120 is restarted, the privileged software 131 can check occurred interrupts.

The privileged software 131 performs management so that the software such as the guest OS that causes the processor 120 to be reset is not executed. When the privileged software 131 manages in this manner, the information processing apparatus 100 can operate safely without the guest OS which causes the reset even when the guest OS is malicious or defective.

Conventionally, the delivery of the device interrupt to the correct guest OS or the correct program cannot be performed without the processor provided with functions for supporting the virtualization. In the first embodiment, however, even when the system LSI is configured for the embedded devices with the use of the processor not provided with the functions for supporting virtualization, the delivery can be realized with an additional hardware without any modification to the processor.

The invention is not limited to the above embodiment, and various modifications are possible as illustrated below.

In the first embodiment, the timer 152 is a count-down timer which counts down from the preset initial value to zero. The timer used for counting the time elapsed since the occurrence of device interrupt is not limited to the count-down timer. In modification 1 of the first embodiment, an up-counter is used. The structure of the modification 1 is the same as that of the first embodiment except for the structure of the interrupt process monitoring device, and the explanation thereof is not repeated.

Figure 9:
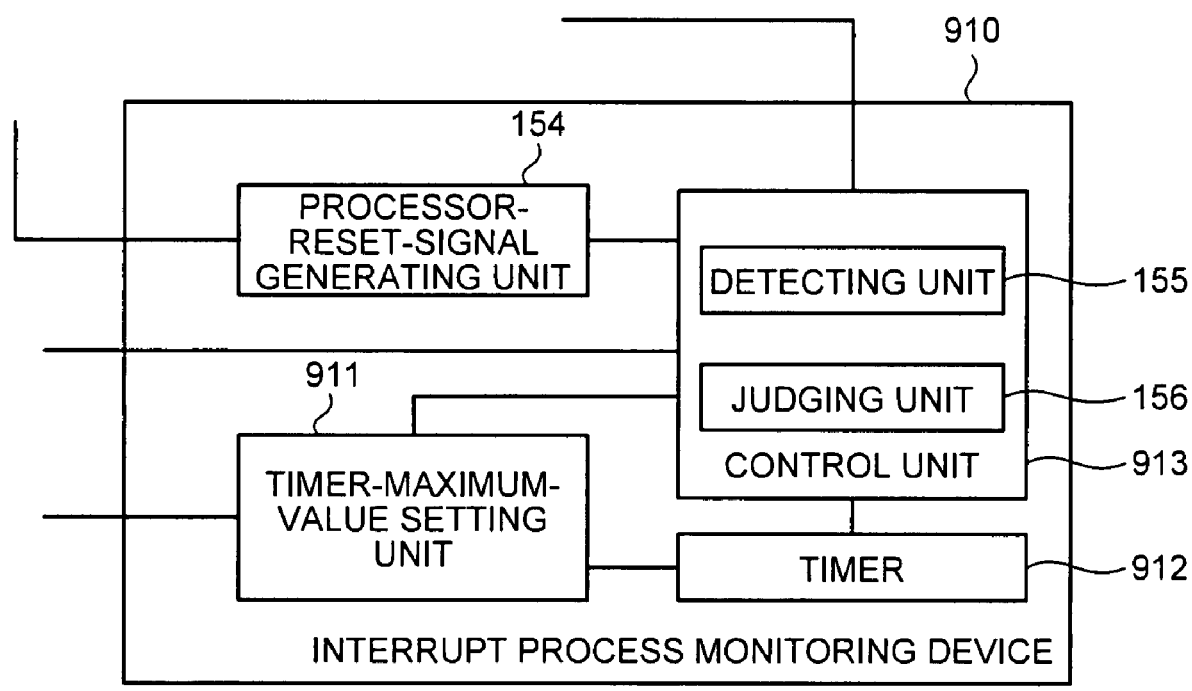
FIG. 9 is a block diagram of an interrupt process monitoring device according to modification 1 of the first embodiment.

As shown in FIG. 9, an interrupt process monitoring device 910 in the modification 1 of the first embodiment is similar to the interrupt process monitoring device 150 in the first embodiment, except that the timer-initial-value setting unit 153 is eliminated, that a timer-maximum-value setting unit 911 is added, that the timer 152 is replaced with a timer 912 which performs a different process from the process of the timer 152, and that the control unit 151 is replaced with a control unit 913 which performs a different process from the process of the control unit 913. The structure of the interrupt process monitoring device 910 of the modification 1 which is the same as the structure of the interrupt process monitoring device 150 is not explained again.

The timer-maximum-value setting unit 911 receives a maximum-value setting request of the timer 912 described later from the privileged software 131. The timer-maximum-value setting unit 911 notifies the control unit 913 of reception of the maximum-value setting request for the timer 912, and sets the maximum value in the timer 912 according to the instruction from the control unit 913. The maximum value set by the timer-maximum-value setting unit 911 is an arbitrary value included in the maximum-value setting request.

The timer 912 is controlled by the control unit 913. In the modification 1, the timer 912 is an up-counter-type timer which monotonously increases the count value from zero to the maximum value (positive value) previously set by the timer-maximum-value setting unit 911.

The control unit 913 monitors the count value of the timer 912, and determines if the count value of the timer 912 has become equal to the maximum value set by the maximum value setting unit 911 or not.

In line with the modification of the interrupt process monitoring device 150, the signal transmitted from the processor 120 is modified from the initial-value setting request of the first embodiment to the maximum-value setting request. The transmission timing of maximum-value setting request is the same as that of the initial-value setting request in the first embodiment, and the explanation thereof is not repeated.

When notified of the reception of the maximum-value setting request from the timer-maximum-value setting unit 911, the control unit 913 sets the state information of the interrupt process monitoring device 910 in the ready state. Here, the ready state is a state in which the maximum value of the timer 912 is set by the timer-maximum-value setting unit 911, and the timer 912 is ready to start counting. Other transitions and processes are the same as in the ready state in the first embodiment, and the explanation thereof is not repeated.

In the running state, the timer 912 has started counting up, but the count value has not reached the maximum value. That is, the timer 912 of the modification 1 counts up from zero up to the maximum value according to periodic input signals such as clock. Other transitions and processes are the same as in the running state in the first embodiment, and the explanation thereof is not repeated.

In the stop state and the pending state, when the control unit 913 is notified that the timer-maximum-value setting unit 911 receives the maximum-value setting request for the timer 912 from the privileged software 131, the control unit 913 sets the state information of the interrupt process monitoring device 910 in the ready state. Other than that, the modification 1 is the same as the first embodiment and the explanation thereof is not repeated.

The first embodiment and the modification 1 are not intended to limit the timer of the interrupt process monitoring device to the up-counter or down-counter, and various other counters may be similarly used.

In the interrupt process monitoring device 150 in the first embodiment, the initial value set in the timer 152 is an arbitrary value included in the initial-value setting request transmitted from the privileged software 131. Alternatively, however, the initial value to be set may not be included in the initial-value setting request transmitted from the privileged software 131, and an initial value preliminarily written in a ROM or the like at the time of manufacture or shipment may be used and set. In modification 2 of the first embodiment, the initial value is preliminarily written in the ROM or the like at the time of manufacture or shipment.

When the initial value is written in the ROM or the like as in the modification 2, later change of initial value can be prevented, and the information processing apparatus 100 can be protected from intentional attack using a false initial value for the timer 152. The structure and processing of an information processing apparatus of the modification 2 are the same as those in the first embodiment, and the explanation thereof is not repeated.

In the modification 2, the timer is a count-down timer and the initial value is written preliminarily, but what is written into the ROM is not limited to the initial value. For example, when an up-counter is used as the timer, the maximum value may be preliminarily written in the ROM or the like.

In the first embodiment, the interrupt controller 140 is responsible for notifying the interrupt process monitoring device 150 and the processor 120 of the occurrence of interruption. The first embodiment, however, is not intended to limit the notification of device interrupt transmitted to the interrupt process monitoring device 150 to the notification from the interrupt controller 140.

Figure 10:
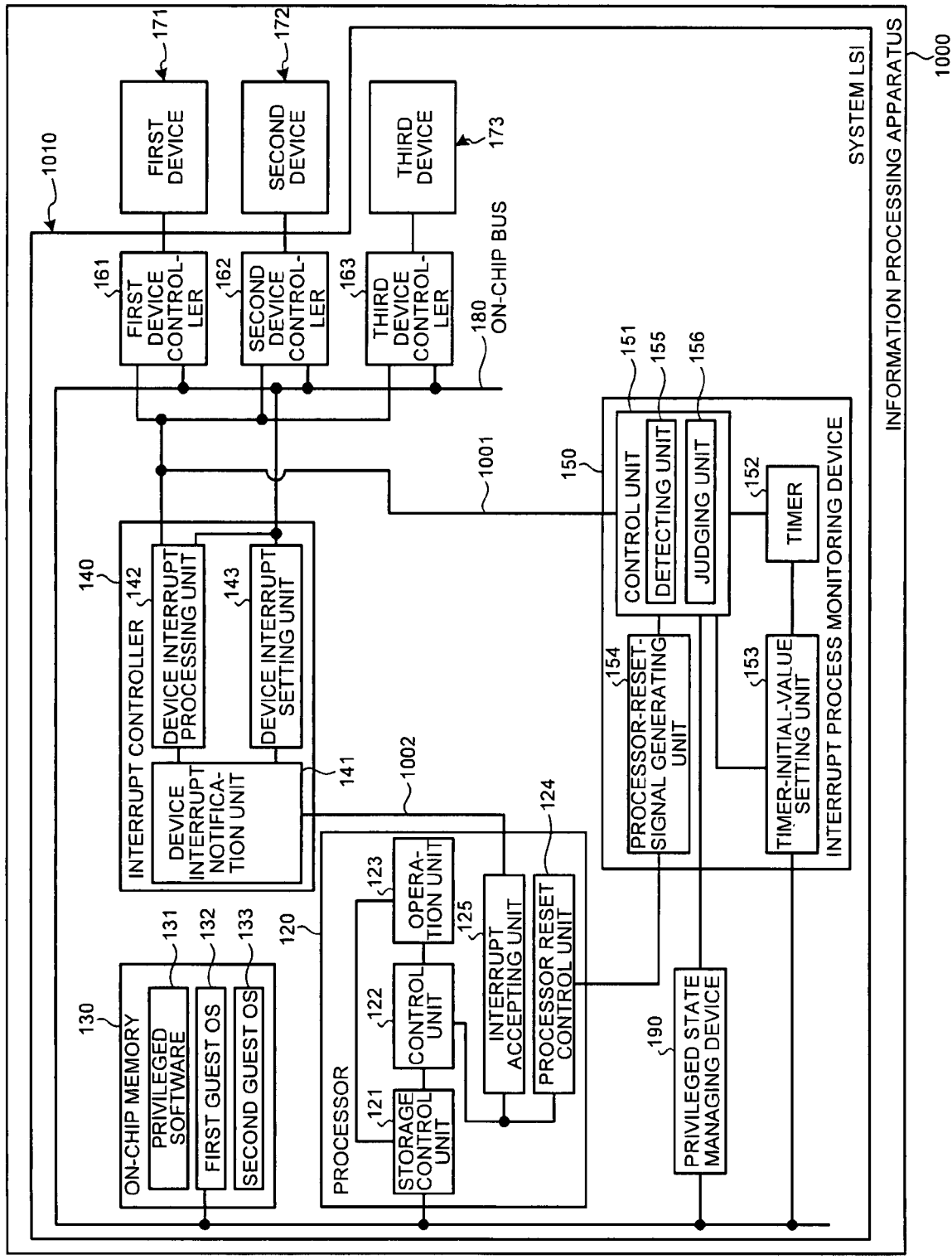
FIG. 10 is a block diagram of an information processing apparatus according to modification 3 of the first embodiment.

In modification 3 of the first embodiment, the device controllers 161 to 163 directly transmit the notification of the occurrence of interrupt to the interrupt process monitoring device 150. As shown in FIG. 10, in the dedicated line connecting the device controllers 161 to 163 and the interrupt controller 140, a dedicated line 1001 branched off in the middle of the route is connected to the interrupt process monitoring device 150.

Accordingly, the structure is modified so that a line 1002 dedicated for notifying the occurrence of interrupt from the interrupt controller 140 is connected only to the processor 120. A system LSI 1010 is similar to the system LSI 110 of the first embodiment except for the structure of the dedicated line 1001 and the dedicated line 1002, and the explanation thereof is not repeated.

When any of the devices generates an interrupt, the device controllers 161 to 163 directly notify the interrupt controller 140 and the control unit 151 of the interrupt process monitoring device 150 of the occurrence of interruption. As a result, the detecting unit 155 can detect the interrupt based on the notification directly sent from the device controllers 161 to 163.

In the first embodiment, the interrupt controller 140 notifies the interrupt process monitoring device 150 and the processor 120 of the occurrence of interrupt. However, it is not necessary for the notification signal indicating the occurrence of interrupt to be transmitted through the interrupt controller 140. In modification 4 of the first embodiment, therefore, the interrupt controller 140 is not used.

Figure 11:
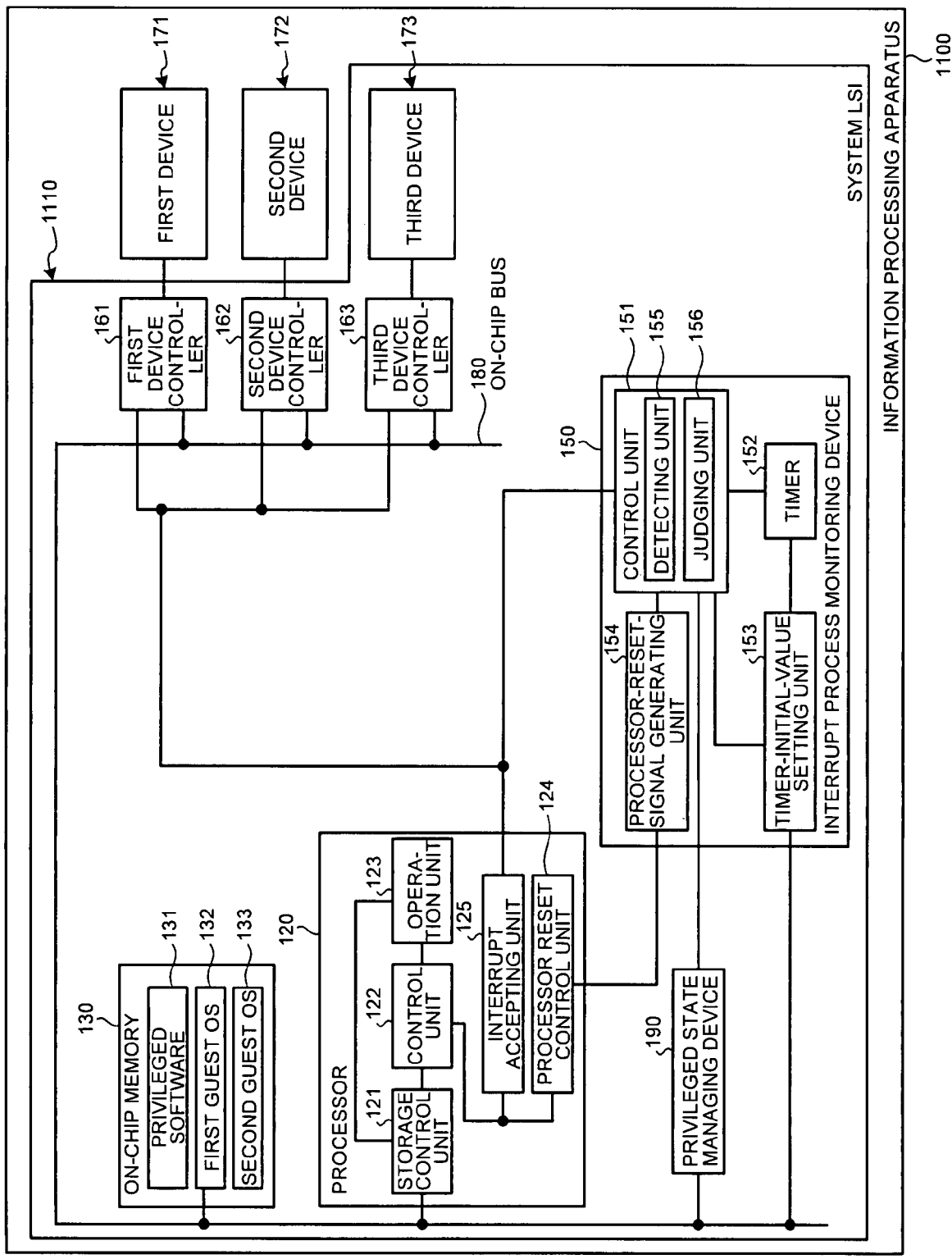
FIG. 11 is a block diagram of an information processing apparatus according to modification 4 of the first embodiment.

As shown in FIG. 11, an information processing apparatus 1100 in the modification 4 is similar to the information processing apparatus 100 in the first embodiment, except for that the interrupt controller 140 is eliminated. In the following explanation, common elements of the first embodiment and the modification 4 are identified with same reference numerals, and the explanation thereof is not repeated.

As shown in FIG. 11, in the information processing apparatus 1100 of the modification 4, the device controllers 161 to 163 are connected to the processor 120 and the interrupt process monitoring device 150 via dedicated lines. Hence, the device controllers 161 to 163 can directly transmit the notification of the occurrence of interrupt to the processor 120 and the interrupt process monitoring device 150. As a result, the detecting unit 155 can detect the interruption based on the notification directly sent from the device controllers 161 to 163.

The process executed by the components of the information processing apparatus 1100 in the modification 4 is similar to the process executed by the components of the information processing apparatus 100 in the first embodiment, except that the interruption notification is sent directly from the device to the processor 120 and the interrupt process monitoring device 150 without passing through the interrupt controller 140, and that the privileged software 131, the first guest OS 132, and the second guest OS 133 confirm the interrupt not with the interrupt controller 140 but directly with the device.

In the following, an example is explained where the first guest OS 132 notifies the privileged software 131 of the occurrence of the interrupt within a predetermined time after the third device 173 makes an interrupt.

Figure 12:
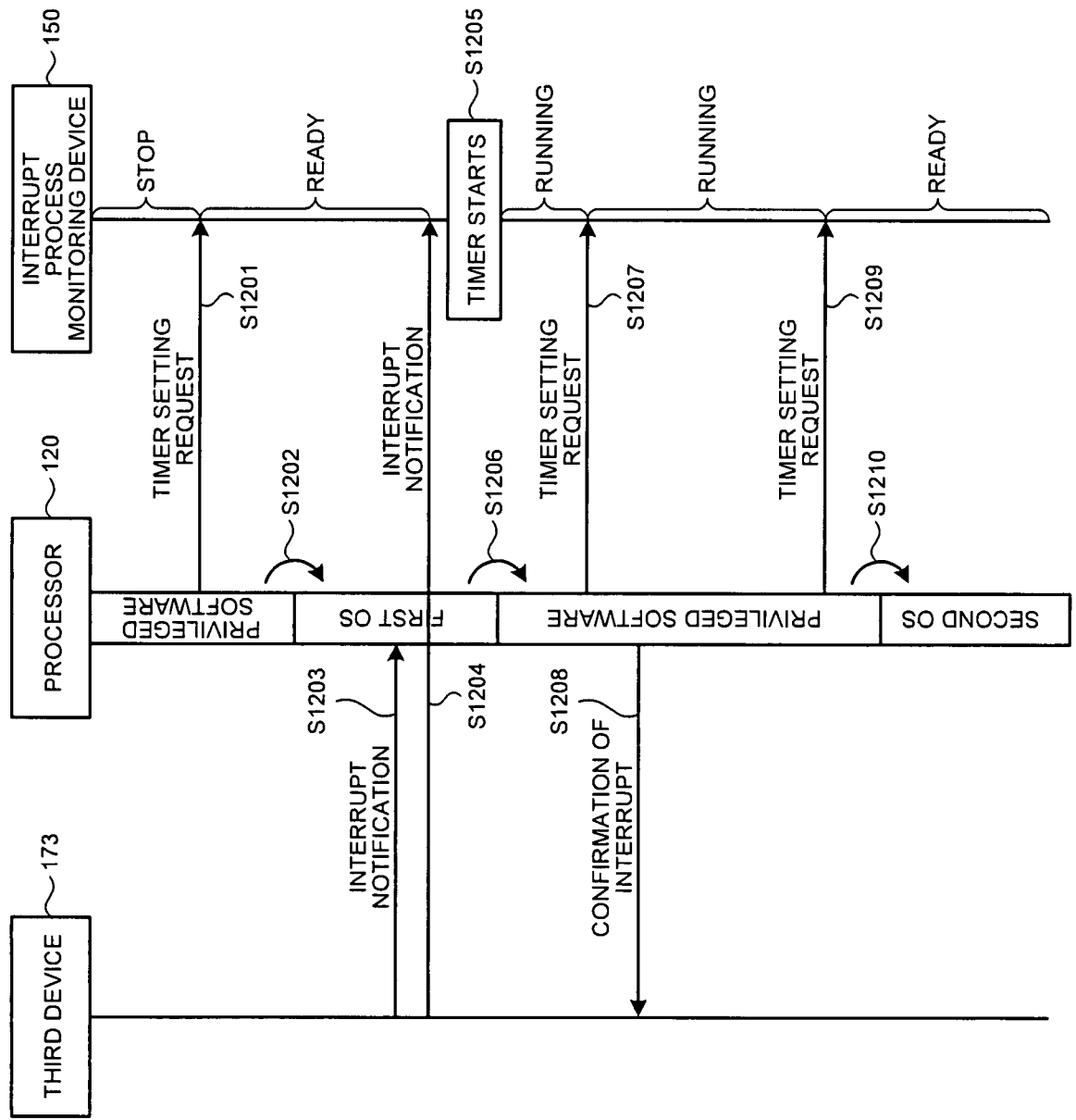
FIG. 12 is a sequence diagram of a communication procedure among devices of the information processing apparatus according to the modification 4 of the first embodiment.

FIG. 12 shows an example where after the notification indicating the interrupt sent from the third device 173 is accepted, the timer-initial-value setting unit 153 of the interrupt process monitoring device 150 receives the initial-value setting request of the timer 152 from the privileged software 131 within a predetermined time. As shown in FIG. 12, communications are made between and among the third device 173, the processor 120, and the interrupt process monitoring device 150.

Steps S1201 to S1202 in FIG. 12 are the same as steps S501 to S502 in FIG. 5, and the explanation thereof is not repeated.

The third device 173 notifies the interrupt request to the first guest OS 132 operating on the processor 120 by way of the third device controller 163 (step S1203). Further, the third device 173 notifies the occurrence of interrupt to the interrupt process monitoring device 150 substantially simultaneously with the notification at step S1203 (step S1204).

Steps S1205 to S1207 in FIG. 12 are the same as steps S506 to S508 in FIG. 5, and the explanation thereof is not repeated.

The privileged software 131 on the processor 120 confirms the interrupt request with the third device 173 (step S1208). Thus, the privileged software 131 confirms the interrupt request with each connected device, whereby the privileged software 131 can identify the device which made the interrupt request.

Steps S1209 to S1210 in FIG. 12 are the same as steps S511 to S512 in FIG. 5, and the explanation thereof is not repeated.

When the first guest OS 132 does not notify the occurrence of the interrupt to the privileged software 131 within a predetermined time after the third device 173 made the interrupt, and the software operating on the processor 120 is not changed, the same processing procedure as that in the first embodiment shown in FIGS. 6 to 8 is performed except for the notification of interrupt from the third device 173 shown in FIG. 12, and the confirmation of interrupt by the processor 120, and the explanation is not repeated.

In the first embodiment, the device controllers 161 to 163 are directly connected to the on-chip device 180 or the interrupt controller 140. In such a case, however, the guest OS operating on the processor 120 in a privilege mode of the highest level can attack the apparatus by making an unjust access so as to make a device make an interrupt, for example. In modification 5 of the first embodiment, therefore, the access from the software such as the guest OS to the device is finely controlled for the protection of the device.

Figure 13:
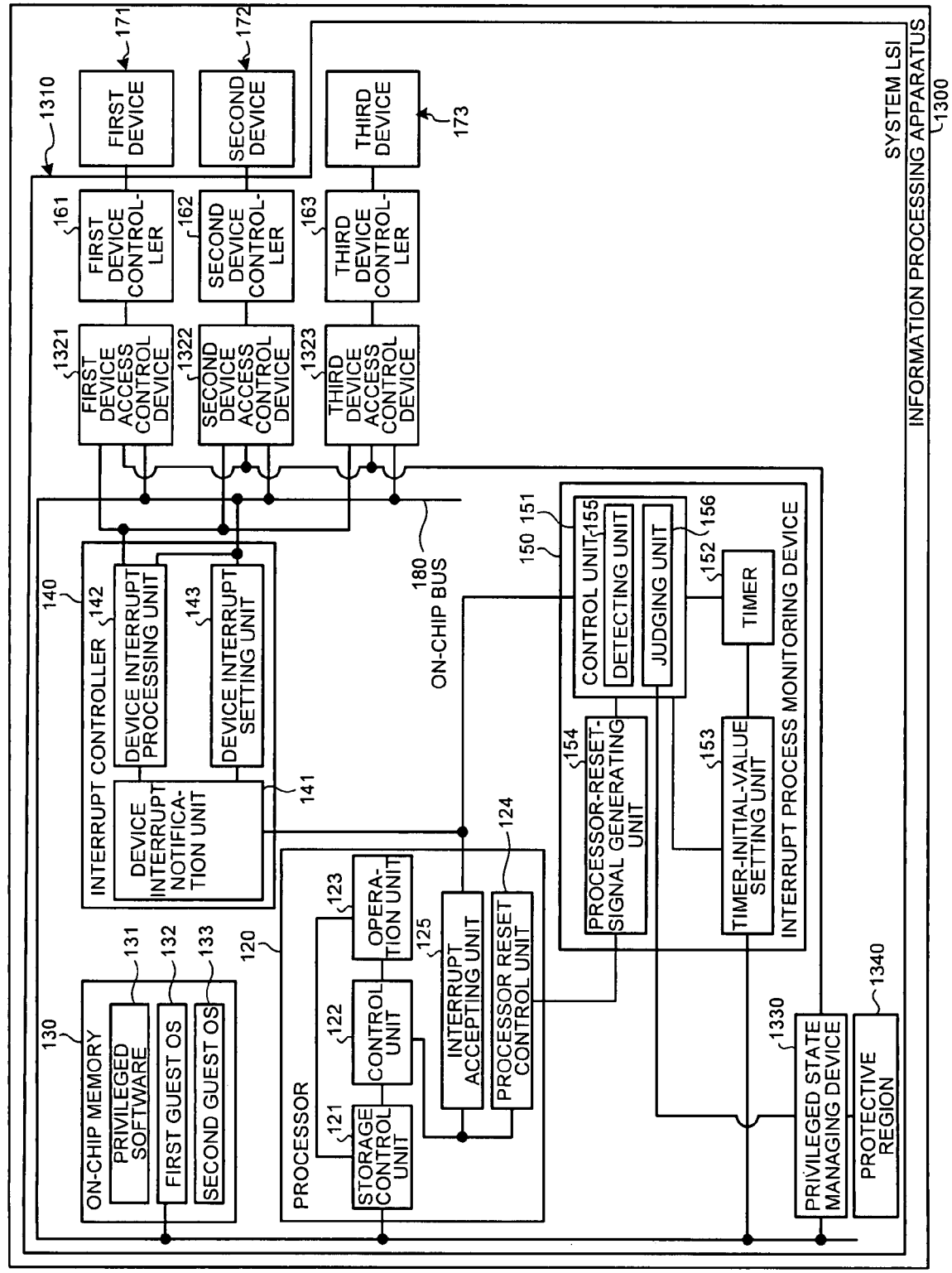
FIG. 13 is a block diagram of an information processing apparatus according to modification 5 of the first embodiment.

As shown in FIG. 13, an information processing apparatus 1300 of the modification 5 is similar to the information processing apparatus 100 in the first embodiment, except that device access control devices 1321 to 1323 are added, that a protected region 1340 is added, and that the privileged state managing device 190 is replaced with a privileged state managing device 1330 which performs a different process from the process of the privileged state managing device 190. In the following explanation, the same elements as in the first embodiment are identified with same reference numerals, and the explanation thereof is not repeated.

The privileged state managing device 1330 sends a signal indicating whether the information processing apparatus 1300 is in the privileged state or not, to the device access control devices 1321 to 1323 and the protected region 1340.

The privileged state managing device 1330 notifies the interrupt process monitoring device 150, similarly to the privileged state managing device 190 in the first embodiment. The notification to the interrupt process monitoring device 150 is the same as that in the first embodiment, and the explanation thereof is not repeated. Thus, the information processing apparatus 1300 can limit the writing to setting information held in the device access control devices 1321 to 1323 to only a time when the information processing apparatus 1300 is in the privileged state, in other words, only when the privileged software 131 is operating. The information processing apparatus 1300 can limit the reading or writing process on the protected region 1340 only to a time when the information processing apparatus 1300 is in the privileged state, that is, only when the privileged software 131 is operating.

The protected region 1340 is a storage region where only the privileged software 131 is allowed to access. The protected region 1340 is a storage unit which stores information for managing the device, and can be configured with any storage unit generally used, such as RAM (random access memory).

The protected region 1340 stores setting data used in the device access control devices 1321 to 1323 described later. If the protected region 1340 receives a writing request while it is notified from the privileged state managing device 1330 that the information processing apparatus 1300 is in the privileged state, the protected region 1340 permits the writing request, assuming that the writing request is made by the privileged software 131.

The privileged software 131 reads out device access control information which is stored in the protected region 1340 and to be set in the device access control devices 1321 to 1323. The privileged software 131 sets the device access control devices 1321 to 1323 by using the device access control information read out.

The device access control information includes information indicating that the first guest OS 132 can access the first device 171, and the second guest OS 133 cannot access the first device 171, for example.

The first device access control device 1321 is connected to the first device controller 161 and the privileged state managing device 1330. The first device access control device 1321 determines whether each of the guest OSs is allowed to access the first device 171 or not according to the stored setting. On determining that the guest OS is allowed to access, the first device access control device 171 transmits data supplied from the guest OS, or transmits data to the guest OS. Since the first device access control device 1321 controls the access by the guest OS to the device as described above, the security can be enhanced.

Further, the first device access control device 1321 accepts a setting change request only when the request is sent from the privileged software 131. The first device access control device 1321 determines whether the access is from the privileged software 131 or not based on the notification from the privileged state managing device 1330 indicating whether the information processing apparatus 1300 is in the privileged state or not. As a result, it is possible to protect the first device access control device 1321 from the guest OS operating in the privilege mode of the highest level on the processor 120, and rewrite of setting of the first device access control device 1321 can be prevented.

The second device access control device 1322 is similar to the first device access control device 1321 except that it is connected to the second device controller 162, and the explanation thereof is not repeated. The third device access control device 1323 is similar to the first device access control device 1321 except that it is connected to the third device controller 163, and the explanation thereof is not repeated.

In the modification 5, the device access control devices and the device controllers are separate units, but they may be assembled in a single unit.

In the modification 5, only the privileged software 131 can rewrite the content of the setting of the device access control devices 1321 to 1323 stored in the protected region 1340. Further, only the privileged software 131 can rewrite the information for the device access control stored in the protected region 1340. Hence, the information processing apparatus 1300 can be firmly protected from attacks by malicious software.

The information processing apparatus 1300 of the modification 5 with the above-described configuration can protect control data for the device access control devices 1321 to 1323 from malicious software. Hence, the safety of the information processing apparatus 1300 can be further enhanced.

Thus, the device control apparatus of the invention is useful for the technology for changing over the guest OSs appropriately in the case where an interrupt occurs from an arbitrary device during operation by a plurality of guest OSs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device control apparatus comprising:
a processor that operates according to software;
an OS storage unit that stores a plurality of Operating Systems that operate on the processor;
a storage unit that stores privileged software that operates on the processor, the privileged software calling a controlling Operating System of the plurality of Operating Systems when the processor receives an interrupt from a device included in the device control apparatus, and the controlling Operating System controlling the device;
a detecting unit that detects an interrupt to the processor from the device while a first Operating System from among the plurality of Operating Systems is operating on the processor;
a judging unit that judges whether the first Operating System has called the privileged software in a first predetermined time from detection of the interrupt to the processor from the device; and
a resetting unit that resets the processor when the judging unit judges that the first Operating System has not called the privileged software.

2. The apparatus of claim 1, further comprising:
a time counting unit that counts until the first predetermined time elapses when the interrupt is detected,
wherein the judging unit judges whether the first Operating System calls the privileged software or not after the time counting unit has counted the first predetermined time.

3. The apparatus of claim 1, wherein
the privileged software sends a start notification to the judging unit to indicate that the privileged software starts an operation when the privileged software starts the operation on the processor in response to the call from the first Operating System, and
the judging unit judges that the first Operating System calls the privileged software when receiving the start notification.

4. The apparatus of claim 3, further comprising:
a privilege judging unit that judges if software operating on the processor is the privileged software or not,
wherein the judging unit, when the privilege judging unit judges that the software operating on the processor is the privileged software even though the start notification is not received, after the first predetermined time has passed, judges again whether the first Operating System has called the privileged software before a second predetermined time passes after the lapse of the first predetermined time.

5. The apparatus of claim 4, wherein the judging unit judges that the first Operating System has not called the privileged software, when the start notification is not received after lapse of the second predetermined time, and when the privilege judging unit judges that the software operating on the processor is not the privileged software.

6. The apparatus of claim 4, further comprising a privileged state managing unit that detects whether the privileged software is operating on the processor, and sends to the privileged judging unit a signal indicating whether the privileged software is operating on the processor based on a detection result, the privileged state managing unit being implemented as hardware different from the processor, wherein the privileged judging unit makes a judgment based on the signal.

7. The apparatus of claim 1, wherein the first Operating System stored in the OS storage unit calls the privileged software when the Operating System detects an interrupt of the device while operating on the processor, regardless of whether the first Operating System can control the device, and switches the device from operating under the first Operating System to operate under the privileged software.

8. The apparatus of claim 1, further comprising:
an interrupt control unit that determines whether to ignore the interrupt or not when receiving the interrupt from the device, and that outputs the interrupt to the processor when determining not to ignore the interrupt.

9. The apparatus of claim 8, wherein
the interrupt control unit further outputs the interrupt to the detecting unit when determining not to ignore the interrupt received from the device.

10. The apparatus of claim 1, further comprising:
an access control unit that controls access to the device by the plurality of Operating Systems operating on the processor, according to setting information set by the privileged software, the setting information indicating whether the first Operating System can access the device or not.

11. A device control apparatus comprising:
a processor that operates according to software;
an OS storage unit that stores a plurality of Operating Systems that operate on the processor;
a storage unit that stores privileged software that operates on the processor, the privileged software calling a controlling Operating System of the plurality of Operating Systems when the processor receives an interrupt from a device connected to the device control apparatus, and the controlling Operating System controlling the device;
a detecting unit that detects an interrupt to the processor from the device while a first Operating System from among the plurality of Operating Systems is operating on the processor;
a judging unit that judges whether the first Operating System has called the privileged software in a first predetermined time from detection of the interrupt to the processor from the device; and a resetting unit that resets the processor when the judging unit judges that the first Operating System has not called the privileged software.

12. The apparatus of claim 11, further comprising:
a time counting unit that counts the first predetermined time when the interrupt is detected,
wherein the judging unit judges whether the first Operating System calls the privileged software or not after the time counting unit has counted the first predetermined time.

13. The apparatus of claim 11, wherein the privileged software sends a start notification to the judging unit to indicate that the privileged software starts an operation when the privileged software starts the operation on the processor in response to the call from the first Operating System, and the judging unit judges that the first Operating System calls the privileged software when receiving the start notification.

14. The apparatus of claim 13, further comprising:
a privilege judging unit that judges if software operating on the processor is the privileged software or not,
wherein the judging unit, when the privilege judging unit judges that the software operating on the processor is the privileged software even though the start notification is not received, after the first predetermined time has passed, judges again whether the first Operating System has called the privileged software before a second predetermined time passes after the lapse of the first predetermined time.

15. The apparatus of claim 14, wherein the judging unit judges that the first Operating System has not called the privileged software, when the start notification is not received after lapse of the second predetermined time, and when the privilege judging unit judges that the software operating on the processor is not the privileged software.

16. The apparatus of claim 11, wherein the first Operating System stored in the OS storage unit calls the privileged software when the Operating System detects an interrupt of the device while operating on the processor, regardless of whether the first Operating System can control the device, and switches the device from operating under the first Operating System to operate under the privileged software.

17. The apparatus of claim 11, further comprising:
an interrupt control unit that determines whether to ignore the interrupt or not when receiving the interrupt from the device, and that outputs the interrupt to the processor when determining not to ignore the interrupt.

18. The apparatus of claim 17, wherein
the interrupt control unit further outputs the interrupt to the detecting unit when determining not to ignore the interrupt received from the device.

19. The apparatus of claim 11, further comprising:
an access control unit that controls access to the device by the plurality of Operating Systems operating on the processor, according to setting information set by the privileged software, the setting information indicating whether the first Operating System can access the device or not.

* * * * *